US012711916B2

(12) United States Patent
Kim et al.

(10) Patent No.: US 12,711,916 B2

(45) Date of Patent: Aug. 18, 2026

(54) DISPLAY DEVICE

(71) Applicant: Samsung Display Co., LTD., Yongin-si (KR)

(72) Inventors: Sung Hwan Kim, Yongin-si (KR); Dae Hyun Kim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/984,130

(22) Filed: Dec. 17, 2024

(65) Prior Publication Data

US 2025/0292733 A1 Sep. 18, 2025

(30) Foreign Application Priority Data

Mar. 13, 2024 (KR) ........................ 10-2024-0035323

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01); *G09G 2320/0209* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 12,136,383 B2* | 11/2024 | Kim | G09G 3/3233 | |
| 2012/0019504 A1* | 1/2012 | Han | G09G 3/3233 | 345/212 |
| 2018/0212061 A1* | 7/2018 | Xie | H10D 62/80 | |
| 2021/0225256 A1* | 7/2021 | Byun | G11C 19/28 | |
| 2021/0408208 A1* | 12/2021 | Park | G09G 3/3233 | |
| 2022/0069044 A1* | 3/2022 | Kwak | H10K 59/1213 | |
| 2022/0208088 A1* | 6/2022 | Kim | H10K 50/813 | |
| 2022/0343844 A1* | 10/2022 | Song | G09G 3/3233 | |
| 2023/0119632 A1* | 4/2023 | Kwon | G09G 3/3233 | 345/690 |
| 2023/0145644 A1* | 5/2023 | Shin | G09G 3/3233 | 345/212 |
| 2023/0232679 A1* | 7/2023 | Heo | H10D 86/60 | 345/206 |
| 2024/0071286 A1* | 2/2024 | Lee | G09G 3/3233 | |

FOREIGN PATENT DOCUMENTS

| | | |
|---|---|---|
| KR | 10-1058110 B1 | 8/2011 |
| KR | 10-1058111 B1 | 8/2011 |
| KR | 10-2022-0138499 A | 10/2022 |
| KR | 10-2023-0056854 A | 4/2023 |

* cited by examiner

*Primary Examiner* — Dorothy Harris

(74) *Attorney, Agent, or Firm* — Womble Bond Dickinson (US) LLP

(57) ABSTRACT

A display device includes: a light emitting element on a substrate; a first transistor to control a driving current to flow through the light emitting element; a second transistor to supply a data voltage to a source electrode of the first transistor; a third transistor electrically connecting a gate electrode of the first transistor and a drain electrode of the first transistor to each other; a fourth transistor to supply a driving voltage to the gate electrode of the first transistor; and a fifth transistor to supply the driving voltage to the drain electrode of the first transistor.

20 Claims, 14 Drawing Sheets

DISPLAY DEVICE

CROSS-REFERENCE TO RELATED APPLICATION

The present application claims priority to and the benefit of Korean Patent Application No. 10-2024-0035323, filed on Mar. 13, 2024, in the Korean Intellectual Property Office, the entire disclosure of which is incorporated by reference herein.

BACKGROUND

1. Field

Aspects of embodiments of the present disclosure relate to a display device.

2. Description of the Related Art

As information society develops, the demand for display devices for displaying images are increasing in various forms. For example, display devices are applied to various electronic devices, such as smartphones, digital cameras, notebook computers, navigation devices, and smart televisions. A display device includes a light emitting element that enables each pixel of a display panel to emit light by itself. Thus, the display device may display an image without a backlight unit that provides light to the display panel.

A display device includes a plurality of pixels, data lines and gate lines connected to the pixels, a data driver for supplying data voltages to the data lines, and a gate driver for supplying gate signals to the gate lines. The data driver and the gate driver may drive the pixels according to a predetermined frequency.

The above information disclosed in this Background section is for enhancement of understanding of the background of the present disclosure, and therefore, it may contain information that does not constitute prior art.

SUMMARY

One or more embodiments of the present disclosure may be directed to a display device that may prevent or substantially prevent crosstalk, may minimize or reduce the number of voltage lines, and/or may have a static electricity resistant structure.

However, the aspects and features of the present disclosure are not restricted to the ones set forth herein. The above and other aspects and features of the present disclosure will become more apparent to one of ordinary skill in the art by referencing the detailed description of the present disclosure given below and the accompanying drawings.

According to one or more embodiments of the present disclosure, a display device includes: a light emitting element on a substrate; a first transistor configured to control a driving current to flow through the light emitting element; a second transistor configured to supply a data voltage to a source electrode of the first transistor; a third transistor electrically connecting a gate electrode of the first transistor and a drain electrode of the first transistor to each other; a fourth transistor configured to supply a driving voltage to the gate electrode of the first transistor; and a fifth transistor configured to supply the driving voltage to the drain electrode of the first transistor.

In an embodiment, the first transistor may include a bias electrode electrically connected to a first electrode of the light emitting element.

In an embodiment, the display device may further include: a sixth transistor electrically connecting the source electrode of the first transistor and a first electrode of the light emitting element to each other; a seventh transistor configured to discharge the first electrode of the light emitting element to an initialization voltage; and a first capacitor between the gate electrode of the first transistor and the first electrode of the light emitting element.

In an embodiment, the second and third transistors may be configured to be turned on based on a first gate signal, the seventh transistor may be configured to be turned on based on a second gate signal, the fourth transistor may be configured to be turned on based on a third gate signal, and the fifth and sixth transistors may be configured to be turned on based on an emission signal.

In an embodiment, the third gate signal may have a high level during a first period, the first gate signal may have a high level during a second period after the first period, the third gate signal may have a high level during a third period including the first period and the second period, and the emission signal may have a high level during a fourth period after the third period.

According to one or more embodiments of the present disclosure, a display device includes: a light emitting element on a substrate; a first transistor configured to control a driving current to flow through the light emitting element; a second transistor configured to supply a data voltage to a source electrode of the first transistor; a third transistor electrically connecting a gate electrode of the first transistor and a drain electrode of the first transistor to each other; a fourth transistor connected to the gate electrode of the first transistor; a fifth transistor configured to supply a driving voltage to the drain electrode of the first transistor; a sixth transistor electrically connecting the source electrode of the first transistor and a first electrode of the light emitting element to each other; a seventh transistor configured to discharge the first electrode of the light emitting element to an initialization voltage; and an eighth transistor configured to supply the driving voltage to the fourth transistor.

In an embodiment, the first transistor may include a bias electrode electrically connected to the first electrode of the light emitting element.

In an embodiment, the display device may further include a first capacitor between the gate electrode of the first transistor and the first electrode of the light emitting element.

In an embodiment, the second and third transistors may be configured to be turned on based on a first gate signal, the seventh and eighth transistors may be configured to be turned on based on a second gate signal, the fourth transistor may be configured to be turned on based on a third gate signal, and the fifth and sixth transistors may be configured to be turned on based on an emission signal.

In an embodiment, the third gate signal may have a high level during a first period, the first gate signal may have a high level during a second period after the first period, the third gate signal may have a high level during a third period including the first period and the second period, and the emission signal may have a high level during a fourth period after the third period.

In an embodiment, the display device may further include: a metal layer on the substrate, and including a bias electrode of the first transistor; an active layer on the metal layer, and including a semiconductor region of the first transistor; a first gate layer on the active layer, and including the gate electrode of the first transistor; a second gate layer on the first gate layer; a first source metal layer on the second gate layer; and a second source metal layer on the first source metal layer, and including a data line extending in a first direction.

In an embodiment, the first source metal layer may include a first connection electrode electrically connecting the data line and a drain electrode of the second transistor to each other.

In an embodiment, the first source metal layer may include a second connection electrode electrically connecting the gate electrode of the first transistor and a drain electrode of the third transistor to each other.

In an embodiment, the metal layer may include an initialization voltage line configured to supply the initialization voltage, and the initialization voltage line may include: a first portion extending in a second direction crossing the first direction, and electrically connected to the seventh transistor; and a second portion extending in the first direction, and connected to the first portion.

In an embodiment, the first source metal layer may include a third connection electrode electrically connecting the first portion of the initialization voltage line and a source electrode of the seventh transistor to each other.

In an embodiment, the first gate layer may include a first capacitor electrode including the gate electrode of the first transistor, and the second gate layer may include a second capacitor electrode overlapping with the first capacitor electrode.

In an embodiment, the first source metal layer may include a first anode connection electrode connected to the second capacitor electrode, and the second source metal layer may include a second anode connection electrode electrically connecting the first anode connection electrode and the first electrode of the light emitting element to each other.

In an embodiment, the second source metal layer may include a driving voltage line configured to supply the driving voltage, and the first source metal layer may include a fourth connection electrode electrically connecting a drain electrode of the fifth transistor and the driving voltage line to each other.

In an embodiment, the display device may further include a plurality of pixels, at least one of the pixels including the first through eighth transistors and the light emitting element. In first and second pixels that are adjacent to each other in the first direction from among the pixels, the drain electrode of the fifth transistor of the first pixel may be integral with a drain electrode of the eighth transistor of the second pixel.

In an embodiment, in third and fourth pixels that are adjacent to each other in a second direction crossing the first direction from among the pixels, the source electrode of the seventh transistor of the third pixel may be integral with the source electrode of the seventh transistor of the fourth pixel.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
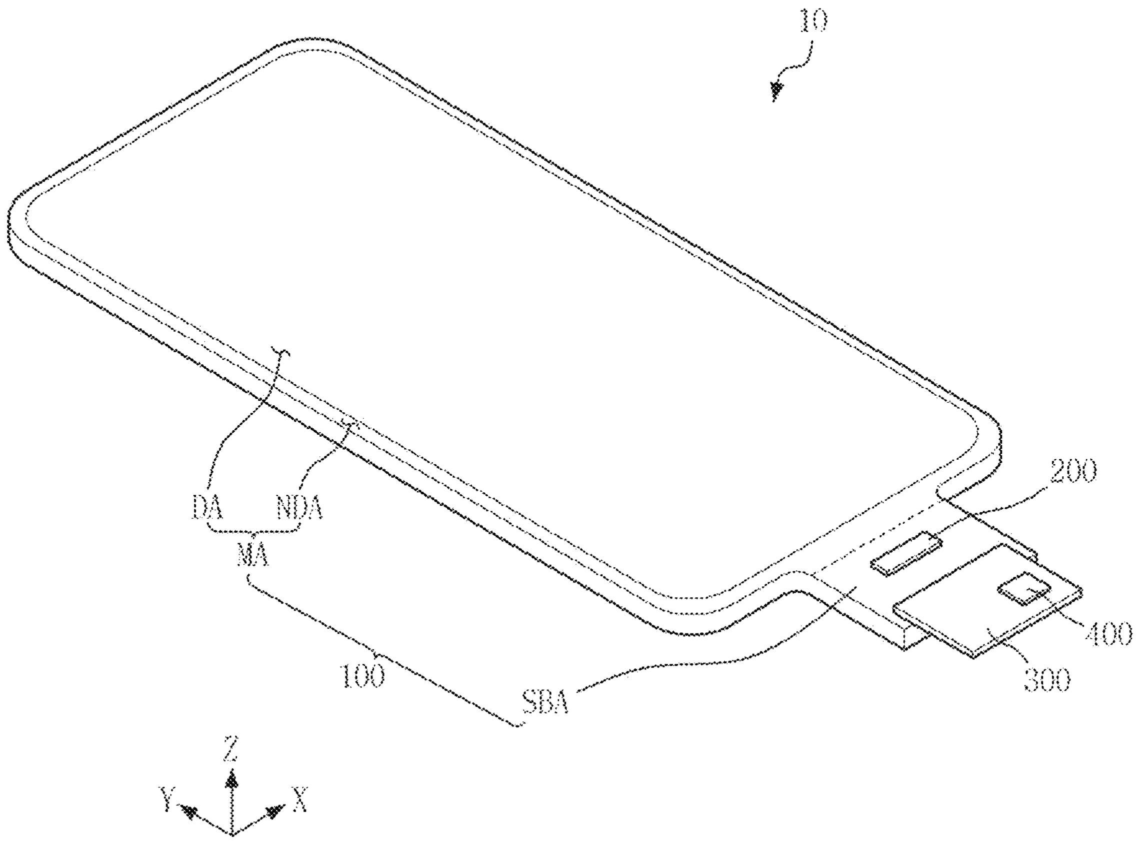
FIG. 1 is a perspective view of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the use of cross-hatching and/or shading is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, and the like of the elements, unless otherwise specified.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device 10 according to an embodiment.

Referring to FIG. 1, the display device 10 may be applied to various suitable portable electronic devices, such as mobile phones, smartphones, tablet personal computers (PCs), mobile communication terminals, electronic notebooks, electronic books, portable multimedia players (PMPs), navigation devices, and ultra-mobile PCs (UMPCs). For example, the display device 10 may be applied as a display unit (e.g., a display or a touch-display) of a television, a notebook computer, a monitor, a billboard, or an Internet of things (IoT) device. As another example, the display device 10 may be applied to various suitable wearable devices, such as smart watches, watch phones, glasses-type displays, and head mounted displays.

The display device 10 may have a planar shape similar to a quadrangle. For example, the display device 10 may have a planar quadrangular shape having short sides extending in the X-axis direction, and long sides extending in the Y-axis direction. Each corner where a short side extending in the X-axis direction meets a long side extending in the Y-axis direction may be rounded with a curvature (e.g., a predetermined curvature), or may be right-angled. The planar shape of the display device 10 is not limited to the quadrangular shape, and the planar shape may also be similar to other suitable polygonal shapes, a circular shape, or an oval shape.

The display device 10 may include a display panel 100, a display driver 200, a circuit board 300, and a touch driver 400.

The display panel 100 may include a main area MA and a sub-area SBA.

The main area MA may include a display area DA including a plurality of pixels that display an image, and a non-display area NDA disposed around the display area DA. The display area DA may emit light from a plurality of emission areas or a plurality of opening areas. For example, the display panel 100 may include pixel circuits including switching elements, a pixel defining layer for defining the emission areas or the opening areas, and self-light emitting elements.

For example, each of the self-light emitting elements may include, but is not limited to, one of an organic light emitting diode including an organic light emitting layer, a quantum dot light emitting diode including a quantum dot light emitting layer, an inorganic light emitting diode including an inorganic semiconductor, or a micro light emitting diode.

The non-display area NDA may be an area outside the display area DA. The non-display area NDA may be defined as an edge area of the main area MA of the display panel 100. The non-display area NDA may include a gate driver that supplies gate signals to gate lines, and fan-out lines that connect the display driver 200 and the display area DA to each other.

The sub-area SBA may extend from a side of the main area MA. The sub-area SBA may include a flexible material that may be bent, folded, rolled, and/or the like. For example, when the sub-area SBA is bent, it may be overlapped by the main area MA in a thickness direction (e.g., the Z-axis direction). The sub-area SBA may include the display driver 200, and a pad unit (e.g., a pad terminal) connected to the circuit board 300. Optionally, the sub-area SBA may be omitted as needed or desired, and the display driver 200 and the pad unit may be disposed in the non-display area NDA.

The display driver 200 may output signals and voltages for driving the display panel 100. The display driver 200 may supply data voltages to data lines. The display driver 200 may supply a power supply voltage to a power line, and may supply a gate control signal to the gate driver. The display driver 200 may be formed as an integrated circuit, and may be mounted on the display panel 100 by a chip on glass (COG) method, a chip on plastic (COP) method, or an ultrasonic bonding method. For example, the display driver 200 may be disposed in the sub-area SBA, and may be overlapped by the main area MA in the thickness direction (e.g., the Z-axis direction) by the bending of the sub-area SBA. As another example, the display driver 200 may be mounted on the circuit board 300.

The circuit board 300 may be attached onto the pad unit of the display panel 100 using an anisotropic conductive film. Lead lines of the circuit board 300 may be electrically connected to the pad unit of the display panel 100. The circuit board 300 may be a flexible printed circuit board, a printed circuit board, or a flexible film, such as a chip on film.

The touch driver 400 may be mounted on the circuit board 300. The touch driver 400 may be electrically connected to a touch sensing unit (e.g., a touch sensor or a touch sensing layer) of the display panel 100. The touch driver 400 may supply a touch driving signal to a plurality of touch electrodes of the touch sensing unit, and may sense a change in a capacitance between the touch electrodes. For example, the touch driving signal may be a pulse signal having a suitable frequency (e.g., a predetermined frequency). The touch driver 400 may determine whether or not an input has been made based on a change in a capacitance between the touch electrodes, and may calculate coordinates of the input. The touch driver 400 may be formed as an integrated circuit.

Figure 2:
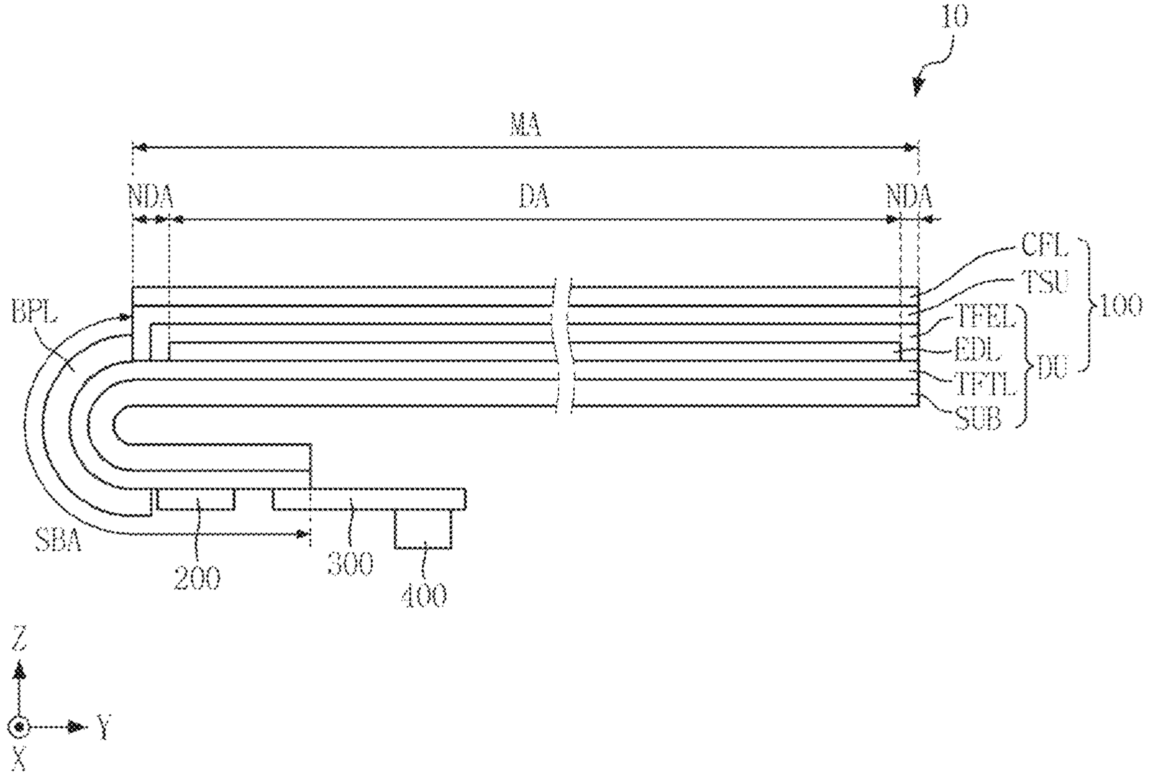
FIG. 2 is a cross-sectional view of the display device according to an embodiment.

FIG. 2 is a cross-sectional view of the display device 10 according to an embodiment.

Referring to FIG. 2, the display panel 100 may include a display unit (e.g., a display layer) DU, a touch sensing unit (e.g., a touch layer) TSU, and a color filter layer CFL. The display unit DU may include a substrate SUB, a transistor layer TFTL, a light emitting element layer EDL, and an encapsulation layer TFEL.

The substrate SUB may be a base substrate or a base member. The substrate SUB may be a flexible substrate that may be bent, folded, rolled, and/or the like. For example, the substrate SUB may include a polymer resin such as polyimide (PI), but the present disclosure is not limited thereto. As another example, the substrate SUB may include a glass material or a metal material.

The transistor layer TFTL may be disposed on the substrate SUB. The transistor layer TFTL may include a plurality of thin-film transistors constituting pixel circuits of the pixels. The transistor layer TFTL may further include gate lines, data lines, power lines, gate control lines, fan-out lines connecting the display driver 200 and the data lines to each other, and lead lines connecting the display driver 200 and the pad unit to each other. Each of the thin-film transistors may include a semiconductor region, a source electrode, a drain electrode, and a gate electrode. For example, when the gate driver is formed on a side of the non-display area NDA of the display panel 100, the gate driver may also include thin-film transistors.

The transistor layer TFTL may be disposed in the display area DA, the non-display area NDA, and the sub-area SBA.

The thin-film transistors of the pixels, the gate lines, the data lines, and the power lines of the transistor layer TFTL may be disposed in the display area DA. The gate control lines and the fan-out lines of the transistor layer TFTL may be disposed in the non-display area NDA. The lead lines of the transistor layer TFTL may be disposed in the sub-area SBA.

The light emitting element layer EDL may be disposed on the transistor layer TFTL. The light emitting element layer EDL may include a plurality of light emitting elements, each including a pixel electrode, a light emitting layer, and a common electrode sequentially stacked to emit light, and a pixel defining layer for defining the pixels. The light emitting elements of the light emitting element layer EDL may be disposed in the display area DA.

For example, the light emitting layer may be an organic light emitting layer including an organic material. The light emitting layer may include a hole transporting layer, an organic light emitting layer, and an electron transporting layer. When the pixel electrode receives a voltage (e.g., a predetermined voltage) through a thin-film transistor of the transistor layer TFTL, and the common electrode receives a cathode voltage, holes may move to the organic light emitting layer through the hole transporting layer, and electrons may move to the organic light emitting layer through the electron transporting layer. Then, the holes and the electrons may be combined with each other in the organic light emitting layer to emit light. For example, the pixel electrode may be an anode, and the common electrode may be a cathode, but the present disclosure is not limited thereto.

As another example, each of the light emitting elements may include a quantum dot light emitting diode including a quantum dot light emitting layer, an inorganic light emitting diode including an inorganic semiconductor, or a micro light emitting diode.

The encapsulation layer TFEL may cover upper and side surfaces of the light emitting element layer EDL, and may protect the light emitting element layer EDL. The encapsulation layer TFEL may include at least one inorganic layer and at least one organic layer to encapsulate the light emitting element layer EDL.

The touch sensing unit TSU may be disposed on the encapsulation layer TFEL. The touch sensing unit TSU may include a plurality of touch electrodes for sensing a user's touch in a capacitive manner, and touch lines connecting the touch electrodes and the touch driver 400 to each other. For example, the touch sensing unit TSU may sense a user's touch in a mutual capacitance manner or a self-capacitance manner.

As another example, the touch sensing unit TSU may be disposed on a separate substrate disposed on the display unit DU. In this case, the substrate for supporting the touch sensing unit TSU may be an encapsulation substrate that encapsulates the display unit DU.

The touch electrodes of the touch sensing unit TSU may be disposed in a touch sensor area overlapping with the display area DA. The touch lines of the touch sensing unit TSU may be disposed in a touch peripheral area overlapping with the non-display area NDA.

The color filter layer CFL may be disposed on the touch sensing unit TSU. The color filter layer CFL may include a plurality of color filters corresponding to a plurality of emission areas, respectively. Each of the color filters may selectively transmit light of a suitable wavelength (e.g., a specific wavelength), and may block or absorb light of other wavelengths. The color filter layer CFL may absorb a part of the light (e.g., external light) coming from the outside of the display device 10, thereby reducing reflected light that may be caused by the external light. Therefore, the color filter layer CFL may prevent or substantially prevent color distortion that may be caused by the reflection of external light.

Because the color filter layer CFL may be directly disposed on the touch sensing unit TSU, the display device 10 may not use a separate substrate for the color filter layer CFL. Therefore, a thickness of the display device 10 may be relatively reduced.

The sub-area SBA of the display panel 100 may extend from a side of the main area MA. The sub-area SBA may include a flexible material that may be bent, folded, rolled, and/or the like. For example, when the sub-area SBA is bent, it may be overlapped by the main area MA in the thickness direction (e.g., the Z-axis direction). The sub-area SBA may include the display driver 200 and the pad unit electrically connected to the circuit board 300.

The display device 10 may include a bending protection layer BPL, which protects the sub-area SBA. The bending protection layer BPL may be disposed on the transistor layer TFTL of the bent sub-area SBA. The bending protection layer BPL may protect the transistor layer TFTL of the bent sub-area SBA, and may minimize or reduce a tensile stress of the sub-area SBA.

Figure 3:
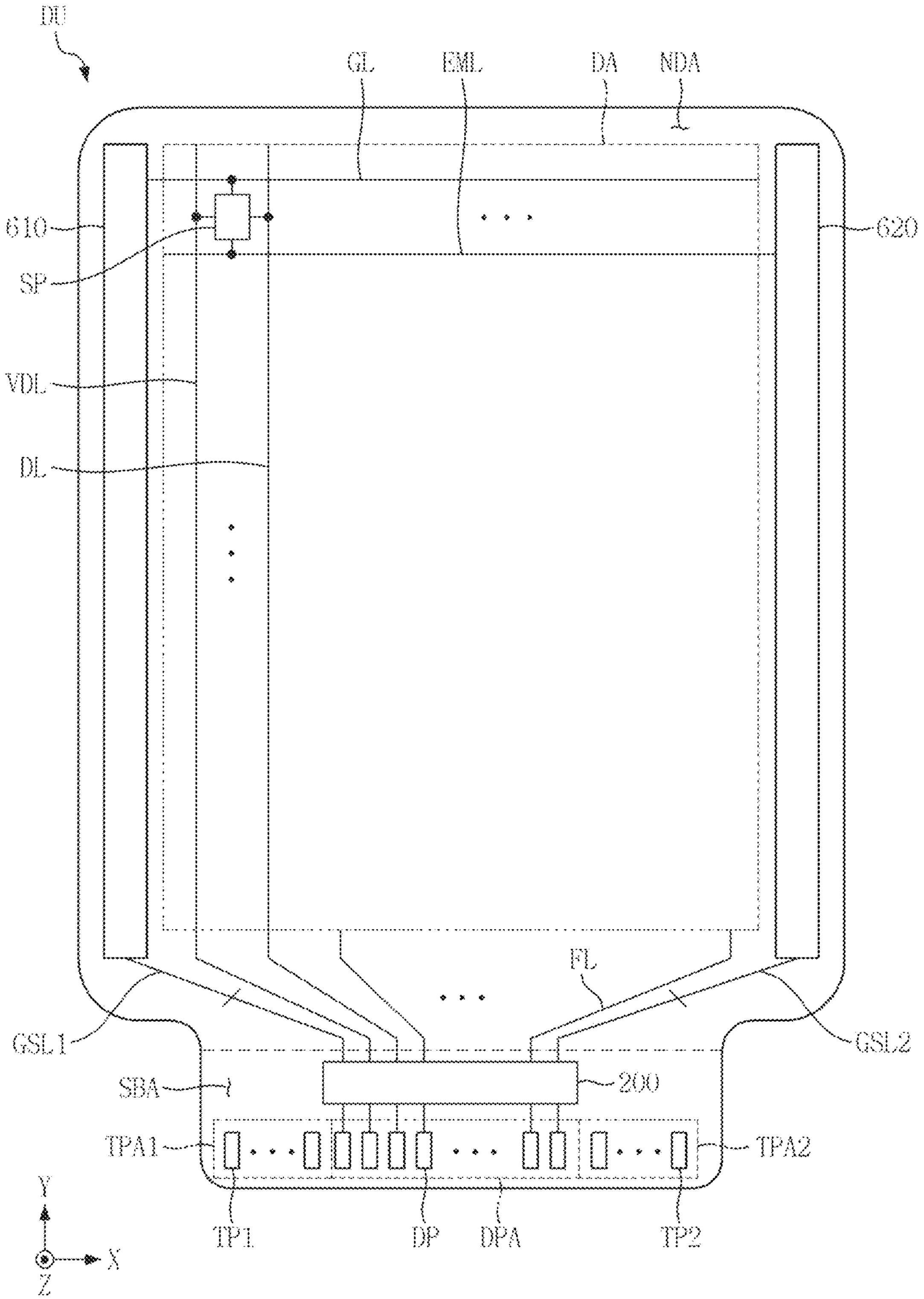
FIG. 3 is a plan view of a display unit of the display device according to an embodiment.
Figure 4:
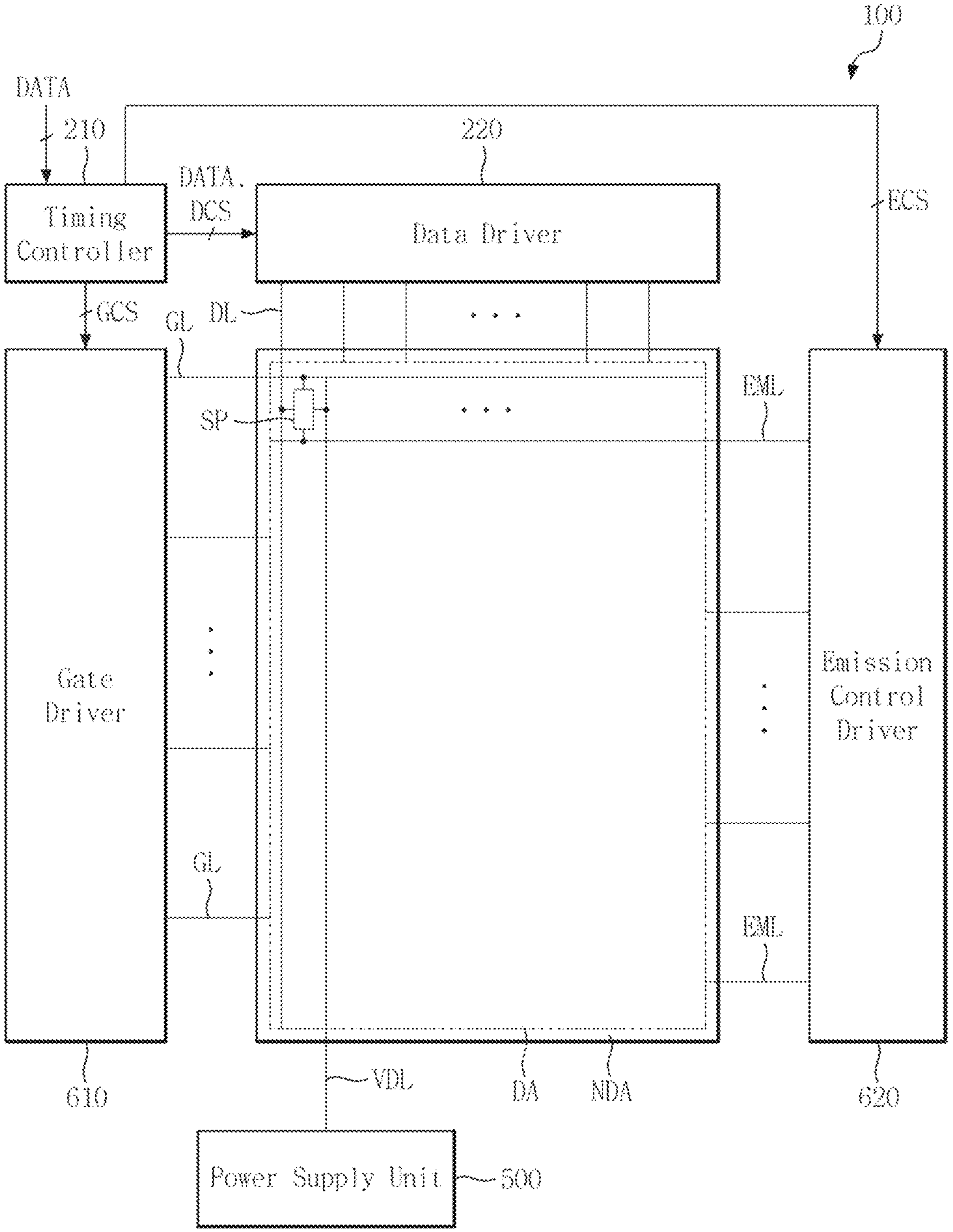
FIG. 4 is a block diagram of a display panel and a display driver according to an embodiment.

FIG. 3 is a plan view of the display unit DU of the display device 10 according to an embodiment. FIG. 4 is a block diagram of the display panel 100 and the display driver 200 according to an embodiment.

Referring to FIGS. 3 and 4, the display panel 100 may include the display area DA and the non-display area NDA. The display area DA may include a plurality of pixels SP, driving voltage lines VDL, gate lines GL, emission control lines EML, and data lines DL.

Each of the pixels SP may be connected to a corresponding gate line GL, a corresponding data line DL, a corresponding emission control line EML, and a corresponding driving voltage line VDL. Each of the pixels SP may include a transistor, a light emitting element, and a capacitor.

The gate lines GL may extend in the X-axis direction, and may be spaced apart from each other in the Y-axis direction intersecting or crossing the X-axis direction. The gate lines GL may sequentially supply gate signals to the pixels SP.

The emission control lines EML may extend in the X-axis direction, and may be spaced apart from each other in the Y-axis direction. The emission control lines EML may sequentially supply emission signals to the pixels SP.

The data lines DL may extend in the Y-axis direction, and may be spaced apart from each other in the X-axis direction. The data lines DL may supply data voltages to the pixels SP. A data voltage may determine a luminance of each of the pixels SP.

The driving voltage lines VDL may extend in the Y-axis direction, and may be spaced apart from each other in the X-axis direction. The driving voltage lines VDL may supply driving voltages to the pixels SP. The driving voltages may be high potential voltages for driving the light emitting elements of the pixels SP.

The non-display area NDA may surround (e.g., around a periphery of) the display area DA. The non-display area NDA may include a gate driver 610, an emission control driver 620, fan-out lines FL, a first gate control line GSL1, and a second gate control line GSL2.

The fan-out lines FL may extend from the display driver 200 to the display area DA. The fan-out lines FL may supply data voltages received from the display driver 200 to the data lines DL. The fan-out lines FL may supply driving voltages received from the display driver 200 to the driving voltage lines VDL.

The first gate control line GSL1 may extend from the display driver 200 to the gate driver 610. The first gate control line GSL1 may supply a gate control signal GCS received from the display driver 200 to the gate driver 610.

The second gate control line GSL2 may extend from the display driver 200 to the emission control driver 620. The second gate control line GSL2 may supply an emission control signal ECS received from the display driver 200 to the emission control driver 620.

The sub-area SBA may extend from a side of the non-display area NDA. The sub-area SBA may include the display driver 200, a display pad area DPA, and first and second touch pad areas TPA1 and TPA2.

The display driver 200 may include a timing controller 210 and a data driver 220.

The timing controller 210 may receive digital video data DATA and timing signals from the circuit board 300. The timing controller 210 may control the operation timing of the data driver 220 by generating a data control signal DCS based on the timing signals, may control the operation timing of the gate driver 610 by generating the gate control signal GCS, and may control the operation timing of the emission control driver 620 by generating the emission control signal ECS. The timing controller 210 may supply the gate control signal GCS to the gate driver 610 through the first gate control line GSL1. The timing controller 210 may supply the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages, and may supply the analog data voltages to the data lines DL through the fan-out lines FL. Gate signals of the gate driver 610 may select pixels SP to which the data voltages are to be supplied, and the selected pixels SP may receive the data voltages through the data lines DL.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using a low-resistance high-reliability material, such as an anisotropic conductive film or a self-assembly anisotropic conductive paste (SAP).

The display pad area DPA may include a plurality of display pad units (e.g., a plurality of display pad terminals) DP. The display pad units DP may be electrically connected to a graphics system through the circuit board 300. The display pad units DP may be connected to the circuit board 300 to receive digital video data, and may supply the digital video data to the display driver 200. The display pad units DP may supply timing signals to the display driver 200.

The first touch pad area TPA1 may be disposed on a side of the display pad area DPA, and may include a plurality of first touch pad units (e.g., a plurality of first touch pad terminals) TP1. The first touch pad units TP1 may be electrically connected to the touch driver 400 disposed on the circuit board 300. The first touch pad units TP1 may supply touch driving signals to a plurality of driving electrodes through a plurality of driving lines.

The second touch pad area TPA2 may be disposed on another side (e.g., an opposite side) of the display pad area DPA, and may include a plurality of second touch pad units (e.g., a plurality of second touch pad terminals) TP2. The second touch pad units TP2 may be electrically connected to the touch driver 400 disposed on the circuit board 300. The touch driver 400 may receive touch sensing signals through a plurality of sensing lines connected to the second touch pad units TP2, and may sense a change in a mutual capacitance between the driving electrodes and sensing electrodes.

A power supply unit (e.g., a power supply) 500 may supply power supply voltages to the display driver 200 and the display panel 100. The power supply unit 500 may generate driving voltages, and may supply the driving voltages to the driving voltage lines VDL. The power supply unit 500 may generate a common voltage, and may supply the common voltage to a common electrode that is common to the light emitting elements of the pixels SP. The power supply unit 500 may generate initialization voltages and supply the initialization voltages to initialization voltage lines, may generate a reference voltage and supply the reference voltage to a reference voltage line, and may generate a bias voltage and supply the bias voltage to a bias voltage line.

The gate driver 610 may be disposed outside one side of the display area DA, or on one side of the non-display area NDA. The emission control driver 620 may be disposed outside another side (e.g., an opposite side) of the display area DA, or on another side (e.g., an opposite side) of the non-display area NDA. However, the present disclosure is not limited thereto. As another example, the gate driver 610 and the emission control driver 620 may be disposed on either one side or the other side (e.g., the opposite side) of the non-display area NDA.

The gate driver 610 may include a plurality of transistors that generate gate signals based on the gate control signal GCS. The emission control driver 620 may include a plurality of transistors that generate emission signals based on the emission control signal ECS. For example, the transistors of the gate driver 610 and the transistors of the emission control driver 620 may be formed at (e.g., in or on) the same layer as those of the transistors of the pixels SP. The gate driver 610 may supply the gate signals to the gate lines GL, and the emission control driver 620 may supply the emission signals to the emission control lines EML.

Figure 5:
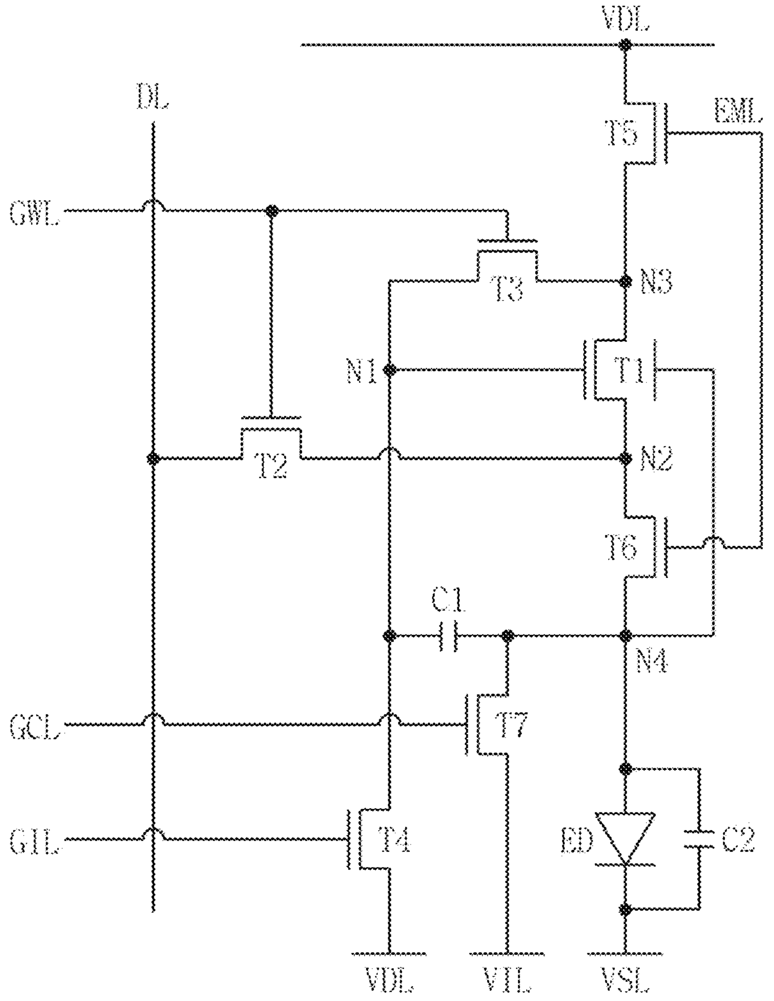
FIG. 5 is a circuit diagram of a pixel of the display device according to an embodiment.
Figure 6:
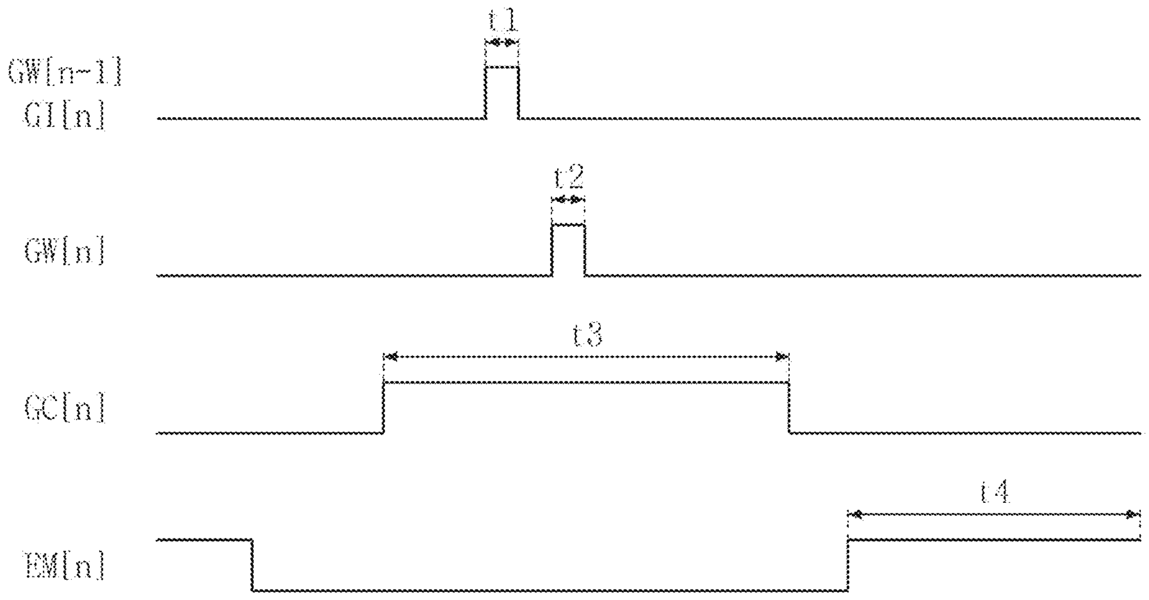
FIG. 6 is a waveform diagram of signals supplied to the pixel illustrated in FIG. 5.

FIG. 5 is a circuit diagram of a pixel SP of the display device 10 according to an embodiment. FIG. 6 is a waveform diagram of signals supplied to the pixel SP illustrated in FIG. 5.

Referring to FIGS. 5 and 6, the display panel 100 may include a plurality of pixels SP arranged along a plurality of rows and columns. Each of the pixels SP may be connected to a corresponding first gate line GWL, a corresponding second gate line GCL, a corresponding third gate line GIL, a corresponding emission control line EML, a corresponding data line DL, a driving voltage line VDL, an initialization voltage line VIL, and a low potential line VSL.

Each of the pixels SP may include a pixel circuit and a light emitting element ED. The pixel circuit may include first through seventh transistors T1 through T7, and first and second capacitors C1 and C2.

The first transistor T1 may include a gate electrode, a drain electrode, and a source electrode. The first transistor T1 may control a drain-source current Ids (hereinafter, referred to as a "driving current") according to a data voltage applied to the gate electrode. The driving current Ids flowing through a channel of the first transistor T1 may be proportional to the square of a difference between a voltage Vgs between the gate electrode and the source electrode of the first transistor T1 and a threshold voltage Vth (e.g., $Ids=k\times(Vgs-Vth)^2$), where k is a proportional coefficient determined by the structure and physical characteristics of the first transistor T1, Vgs is a gate-source voltage of the first transistor T1, and Vth is a threshold voltage of the first transistor T1.

The first transistor T1 may include a bias electrode. The bias electrode of the first transistor T1 may be electrically connected to a first electrode of the light emitting element ED through a fourth node N4, and may overlap with a semiconductor region of the first transistor T1. The bias electrode of the first transistor T1 may stably control the driving current Ids by stabilizing an operating point of the first transistor T1.

The light emitting element ED may receive the driving current Ids and emit light. The amount of light emitted from the light emitting element ED (e.g., the luminance of the light emitting element ED) may be proportional to the magnitude of the driving current Ids.

The light emitting element ED may be an organic light emitting diode including a first electrode, a second electrode, and an organic light emitting layer disposed between the first electrode and the second electrode. The first electrode of the light emitting element ED may be a pixel electrode, and the second electrode may be a common electrode. As another example, the light emitting element ED may be an inorganic light emitting element including a first electrode, a second electrode, and an inorganic semiconductor disposed between the first electrode and the second electrode. As another example, the light emitting element ED may be a quantum dot light emitting element including a first electrode, a second electrode, and a quantum dot light emitting layer disposed between the first electrode and the second electrode. As another example, the light emitting element ED may be a micro light emitting diode.

The first electrode of the light emitting element ED may be electrically connected to the fourth node N4. The first electrode of the light emitting element ED may be connected to the bias electrode of the first transistor T1, a source electrode of the sixth transistor T6, a drain electrode of the seventh transistor T7, and a second capacitor electrode of the first capacitor C1 through the fourth node N4. The second electrode of the light emitting element ED may be connected to the low potential line VSL. The second electrode of the light emitting element ED may receive a low potential voltage from the low potential line VSL.

The second transistor T2 may be turned on by a first gate signal GW[n] of the first gate line GWL to electrically connect the data line DL and a second node N2, which is the source electrode of the first transistor T1, to each other. The second transistor T2 that is turned on based on the first gate signal GW[n] may supply a data voltage to the second node N2. The second transistor T2 may have a gate electrode connected to the first gate line GWL, a drain electrode connected to the data line DL, and a source electrode connected to the second node N2.

The third transistor T3 may be turned on by the first gate signal GW[n] of the first gate line GWL to electrically connect a first node N1, which is the gate electrode of the first transistor T1, and a third node N3, which is the drain electrode of the first transistor T1, to each other. The third transistor T3 that is turned on based on the first gate signal GW[n] may sample a data voltage and a threshold voltage to the gate electrode of the first transistor T1. The third transistor T3 may have a gate electrode connected to the first gate line GWL, a drain electrode connected to the first node N1, and a source electrode connected to the third node N3.

The fourth transistor T4 may be turned on by a third gate signal GI[n] of the third gate line GIL to electrically connect the first node N1, which is the gate electrode of the first transistor T1, and the driving voltage line VDL to each other. The fourth transistor T4 that is turned on based on the third gate signal GI[n] may supply a driving voltage to the first node N1. The fourth transistor T4 may have a gate electrode connected to the third gate line GIL, a drain electrode connected to the driving voltage line VDL, and a source electrode connected to the first node N1.

The fifth transistor T5 may be turned on by an emission signal EM[n] of the emission control line EML to electrically connect the driving voltage line VDL and the third node N3, which is the drain electrode of the first transistor T1, to each other. The fifth transistor T5 may have a gate electrode connected to the emission control line EML, a drain electrode connected to the driving voltage line VDL, and a source electrode connected to the third node N3.

The sixth transistor T6 may be turned on by the emission signal EM[n] of the emission control line EML to electrically connect the second node N2, which is the source electrode of the first transistor T1, and the fourth node N4, which is the first electrode of the light emitting element ED, to each other. The sixth transistor T6 may have a gate electrode connected to the emission control line EML, a drain electrode connected to the second node N2, and the source electrode connected to the fourth node N4.

When the fifth transistor T5, the first transistor T1, and the sixth transistor T6 are all turned on, a driving current may be supplied to the light emitting element ED.

The seventh transistor T7 may be turned on by a second gate signal GC[n] of the second gate line GCL to electrically connect the fourth node N4, which is the first electrode of the light emitting element ED, and the initialization voltage line VIL to each other. The seventh transistor T7 that is turned on based on the second gate signal GC[n] may discharge the first electrode of the light emitting element ED to an initialization voltage. The seventh transistor T7 may have a gate electrode connected to the second gate line GCL, the drain electrode connected to the fourth node N4, and a source electrode connected to the initialization voltage line VIL.

Each of the first through seventh transistors T1 through T7 may include an oxide-based semiconductor region. A transistor including the oxide-based semiconductor region may have a coplanar structure in which a gate electrode is disposed at the top. A transistor having the coplanar structure may have excellent leakage current characteristics, and may be driven at low frequencies, thereby reducing a power consumption. Therefore, the display device 10 including the transistors having excellent leakage current characteristics may prevent or substantially prevent a leakage current from flowing inside a pixel, and may stably maintain a voltage inside the pixel.

The first through seventh transistors T1 through T7 may correspond to N-type transistors. Each of the first through seventh transistors T1 through T7 may include N-type doped drain and source electrodes. For example, each of the first through seventh transistors T1 through T7 may output a current, which flows into the drain electrode, to the source electrode based on a gate-high voltage applied to the gate electrode.

As another example, at least one of the first through seventh transistors T1 through T7 may include a silicon-based semiconductor region. At least one of the first through seventh transistors T1 through T7 may include a semiconductor region including (e.g., made of) a low temperature polycrystalline silicon (LTPS). An active layer including (e.g., made of) the low temperature polycrystalline silicon may have high electron mobility and excellent turn-on characteristics. Therefore, the display device 10 including the transistors with excellent turn-on characteristics may stably and efficiently drive the pixels SP.

The first capacitor C1 may be connected between the first node N1, which is the gate electrode of the first transistor T1, and the fourth node N4, which is the first electrode of the light emitting element ED. For example, a first capacitor electrode of the first capacitor C1 may be electrically connected to the first node N1, and the second capacitor electrode of the first capacitor C1 may be electrically connected to the fourth node N4. Accordingly, a potential difference between the gate electrode of the first transistor T1 and the first electrode of the light emitting element ED may be maintained or substantially maintained.

The second capacitor C2 may be formed between the first electrode and the second electrode of the light emitting element ED. The second capacitor C2 may maintain or substantially maintain a potential difference between the first electrode and the second electrode of the light emitting element ED.

Referring to FIG. 6 in conjunction with FIG. 5, when the display device 10 is driven at a suitable driving frequency (e.g., a predetermined driving frequency), one frame period may include first through fourth periods t1 through t4.

The fourth transistor T4 may receive the third gate signal GI[n] at a high level during the first period t1. The third gate signal GI[n] supplied to an $n^{th}$ pixel row (where, n is an integer of 2 or more) may be the same as a first gate signal GW[n−1] supplied to an $(n-1)^{th}$ pixel row. The fourth transistor T4 may be turned on based on the third gate signal GI[n] at the high level, and may supply a driving voltage to the first node N1, which is the gate electrode of the first transistor T1. Therefore, the fourth transistor T4 may initialize the gate electrode of the first transistor T1 during the first period t1.

The second transistor T2 may receive the first gate signal GW[n] at a high level during the second period t2. The second transistor T2 may be turned on based on the first gate signal GW[n] at the high level, and may supply a data voltage to the second node N2, which is the source electrode of the first transistor T1.

The third transistor T3 may receive the first gate signal GW[n] at a high level during the second period t2. The third transistor T3 may be turned on based on the first gate signal GW[n] at the high level, and may electrically connect the first node N1 and the third node N3 to each other.

When the source electrode of the first transistor T1 receives a data voltage VDATA, the gate-source voltage Vgs of the first transistor T1 may correspond to a difference voltage (e.g., VDD−VDATA) between a driving voltage VDD and the data voltage VDATA, and thus, the first transistor T1 may be turned on when the gate-source voltage Vgs becomes greater than the threshold voltage Vth (e.g., VDD−VDATA>=Vth). At the moment when the second and third transistors T2 and T3 are turned on in the first period t1, the drain-source current Ids of the first transistor T1 may be determined according to the driving voltage VDD, the data voltage VDATA, and the threshold voltage Vth (e.g., $Ids=k\times(VDD-VDATA-Vth)^2$). The first transistor T1 may supply the drain-source current Ids to the second node N2, until the gate-source voltage Vgs reaches the threshold voltage Vth of the first transistor T1. As such, the voltage of the first node N1 and the drain-source current Ids of the first transistor T1 may be changed while the first transistor T1 is turned on, and the voltage of the first node N1 may eventually converge to a difference voltage (e.g., VDATA−Vth) between the data voltage VDATA and the threshold voltage Vth of the first transistor T1.

The seventh transistor T7 may receive the second gate signal GC[n] at a high level during the third period t3. The seventh transistor T7 may be turned on based on the second gate signal GC[n] at the high level, and may discharge the first electrode of the light emitting element ED to an initialization voltage. Therefore, the seventh transistor T7 may initialize the first electrode of the light emitting element ED during the third period t3.

The emission signal EM[n] may have a gate-high voltage during the fourth period t4. When the emission signal EM[n] has a high level, the fifth and sixth transistors T5 and T6 may be turned on to supply a driving current to the light emitting element ED.

Figure 7:
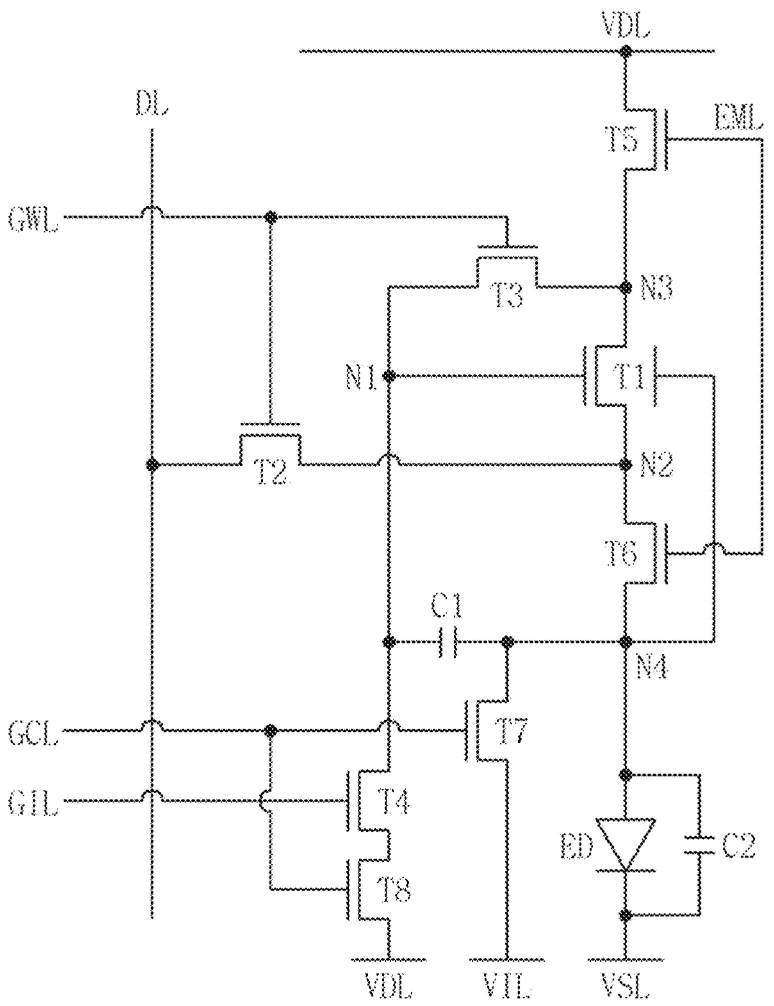
FIG. 7 is a circuit diagram of a pixel of a display device according to an embodiment.

FIG. 7 is a circuit diagram of a pixel SP of a display device 10 according to an embodiment. The pixel SP of FIG. 7 may further include an eighth transistor T8 when compared to the pixel SP described above with reference to FIG. 5. Therefore, hereinafter, the same or substantially the same elements as those described above may be described briefly, or redundant description thereof may not be repeated. The pixel SP illustrated in FIG. 7 may receive the first through third gate signals GW[n], GC[n], and GI[n] and the emission signal EM[n] described above with reference to FIG. 6.

Referring to FIG. 7, the display panel 100 may include the plurality of pixels SP arranged along a plurality of rows and columns. Each of the pixels SP may be connected to the first gate line GWL, the second gate line GCL, the third gate line GIL, the emission control line EML, the data line DL, the driving voltage line VDL, the initialization voltage line VIL, and the low potential line VSL.

Each of the pixels SP may include a pixel circuit and a light emitting element ED. The pixel circuit may include first through eighth transistors T1 through T8, and first and second capacitors C1 and C2.

The first transistor T1 may include a gate electrode, a drain electrode, and a source electrode. The first transistor T1 may control a drain-source current Ids or driving current according to a data voltage applied to the gate electrode. The first transistor T1 may include a bias electrode. The bias electrode of the first transistor T1 may be electrically connected to a first electrode of the light emitting element ED through a fourth node N4, and may overlap with a semiconductor region of the first transistor T1.

The light emitting element ED may receive the driving current Ids and emit light. The amount of light emitted from the light emitting element ED (e.g., the luminance of the light emitting element ED) may be proportional to the magnitude of the driving current Ids. The first electrode of the light emitting element ED may be electrically connected to the fourth node N4. The first electrode of the light emitting element ED may be connected to the bias electrode of the first transistor T1, a source electrode of the sixth transistor T6, a drain electrode of the seventh transistor T7, and a second capacitor electrode of the first capacitor C1 through the fourth node N4. A second electrode of the light emitting element ED may be connected to the low potential line VSL. The second electrode of the light emitting element ED may receive a low potential voltage from the low potential line VSL.

The second transistor T2 may be turned on by the first gate signal GW[n] of the first gate line GWL to electrically connect the data line DL and a second node N2, which is the source electrode of the first transistor T1, to each other.

The third transistor T3 may be turned on by the first gate signal GW[n] of the first gate line GWL to electrically connect a first node N1, which is the gate electrode of the first transistor T1, and a third node N3, which is the drain electrode of the first transistor T1, to each other.

The fourth transistor T4 may be turned on by the third gate signal GI[n] of the third gate line GIL to electrically connect the first node N1, which is the gate electrode of the first transistor T1, and the eighth transistor T8 to each other. The fourth transistor T4 may have a gate electrode connected to the third gate line GIL, a drain electrode connected to a source electrode of the eighth transistor T8, and a source electrode connected to the first node N1.

The fifth transistor T5 may be turned on by the emission signal EM[n] of the emission control line EML to electrically connect the driving voltage line VDL and the third node N3, which is the drain electrode of the first transistor T1, to each other.

The sixth transistor T6 may be turned on by the emission signal EM[n] of the emission control line EML to electrically connect the second node N2, which is the source electrode of the first transistor T1, and the fourth node N4, which is the first electrode of the light emitting element ED, to each other.

When the fifth transistor T5, the first transistor T1, and the sixth transistor T6 are all turned on, a driving current may be supplied to the light emitting element ED.

The seventh transistor T7 may be turned on by the second gate signal GC[n] of the second gate line GCL to electrically connect the fourth node N4, which is the first electrode of the light emitting element ED, and the initialization voltage line VIL to each other.

The eighth transistor T8 may be turned on by the second gate signal GC[n] of the second gate line GCL to electrically connect the fourth transistor T4 and the driving voltage line VDL to each other. Referring further to FIG. 6, the third period t3 may include the first period t1. Therefore, the eighth transistor T8 may be turned on based on the second gate signal GC[n] during the third period t3, and the fourth transistor T4 may be turned on based on the third gate signal GI[n] during the first period t1. Accordingly, the fourth and eighth transistors T4 and T8 may supply a driving voltage to the first node N1. The eighth transistor T8 may have a gate electrode connected to the second gate line GCL, a drain electrode connected to the driving voltage line VDL, and the source electrode connected to the drain electrode of the fourth transistor T4.

The fourth and eighth transistors T4 and T8 may supply a driving voltage, instead of an initialization voltage, to the gate electrode of the first transistor T1. A line width of the driving voltage line VDL may be greater than those of other lines, and a resistance of the driving voltage line VDL may be relatively small. When an initialization voltage is supplied to the first node N1, which is the gate electrode of the first transistor T1, a period of change in the initialization voltage may be insufficient during a high-level period of the third gate signal GI[n], and the level of the initialization voltage may change unstably, and thus, crosstalk may be caused. When a driving voltage is supplied to the first node N1, it may change sufficiently during the high-level period of the third gate signal GI[n], and the level of the driving voltage may be maintained stably, and thus, crosstalk may be prevented or substantially prevented. Therefore, the display device 10 may prevent or substantially prevent crosstalk by using a driving voltage for generating a driving current to initialize the first node N1, and a separate voltage line for initializing the gate electrode GE1 of the first transistor T1 may be omitted. In addition, the display device 10 may improve a design freedom, and may implement high-resolution pixels.

Each of the first through eighth transistors T1 through T8 may include an oxide-based semiconductor region. A transistor including the oxide-based semiconductor region may have a coplanar structure in which a gate electrode is disposed at the top. A transistor having the coplanar structure may have excellent leakage current characteristics, and may be driven at low frequencies, thereby reducing a power consumption. Therefore, the display device 10 including the transistors having excellent leakage current characteristics may prevent or substantially prevent a leakage current from flowing inside a pixel, and may stably maintain a voltage inside the pixel.

The first through eighth transistors T1 through T8 may correspond to N-type transistors. Each of the first through eighth transistors T1 through T8 may include N-type doped drain and source electrodes. For example, each of the first through eighth transistors T1 through T8 may output a current, which flows into the drain electrode, to the source electrode based on a gate-high voltage applied to the gate electrode.

As another example, at least one of the first through eighth transistors T1 through T8 may include a silicon-based semiconductor region. At least one of the first through eighth transistors T1 through T8 may include a semiconductor region including (e.g., made of) a low temperature polycrystalline silicon (LTPS). An active layer including (e.g., made of) the low temperature polycrystalline silicon may have high electron mobility and excellent turn-on characteristics. Therefore, the display device 10 including the transistors with excellent turn-on characteristics may stably and efficiently drive the pixels SP.

The first capacitor C1 may be connected between the first node N1, which is the gate electrode of the first transistor T1, and the fourth node N4, which is the first electrode of the light emitting element ED. For example, a first capacitor electrode of the first capacitor C1 may be electrically connected to the first node N1, and a second capacitor electrode of the first capacitor C1 may be electrically connected to the fourth node N4. Accordingly, a potential difference between the gate electrode of the first transistor T1 and the first electrode of the light emitting element ED may be maintained or substantially maintained.

The second capacitor C2 may be formed between the first electrode and the second electrode of the light emitting element ED. The second capacitor C2 may maintain or substantially maintain a potential difference between the first electrode and the second electrode of the light emitting element ED.

Figure 8:
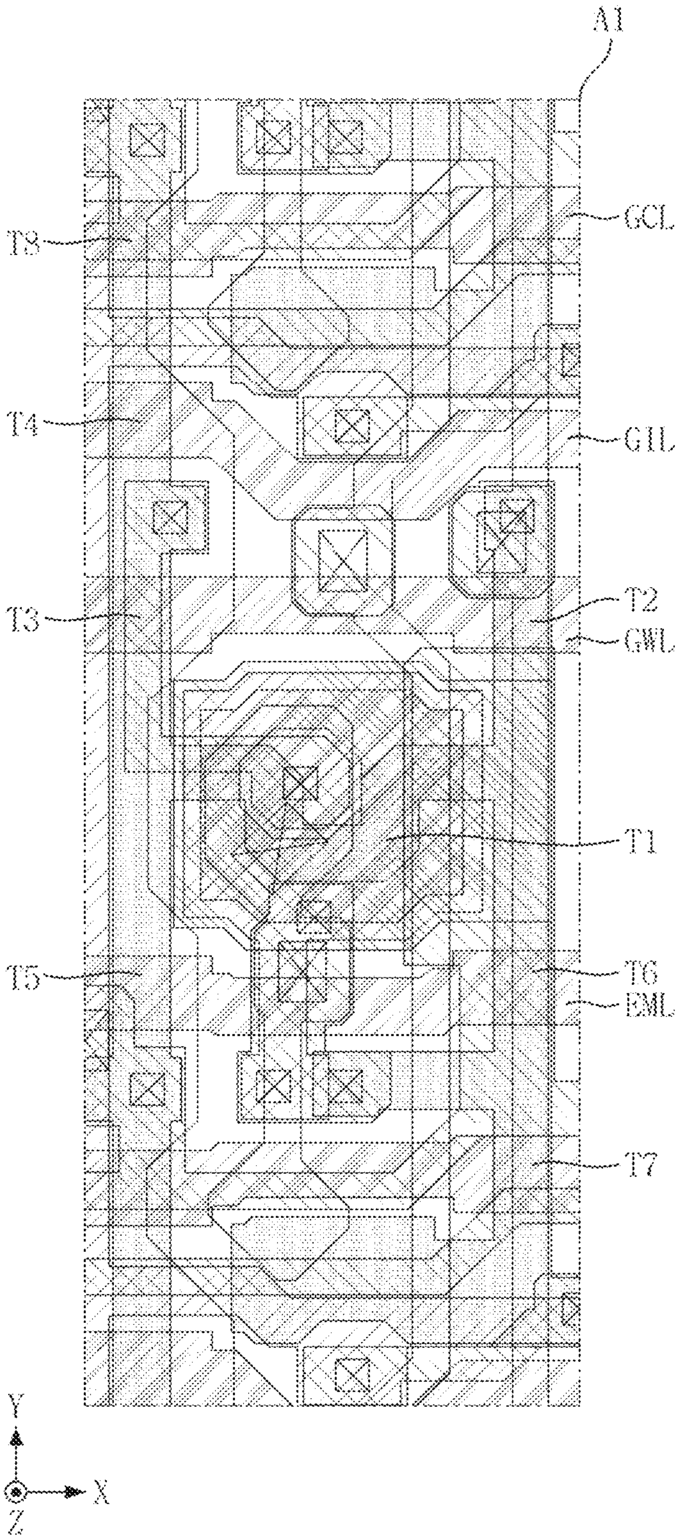
FIG. 8 is a layout view of the pixel illustrated in FIG. 7.
Figure 9:
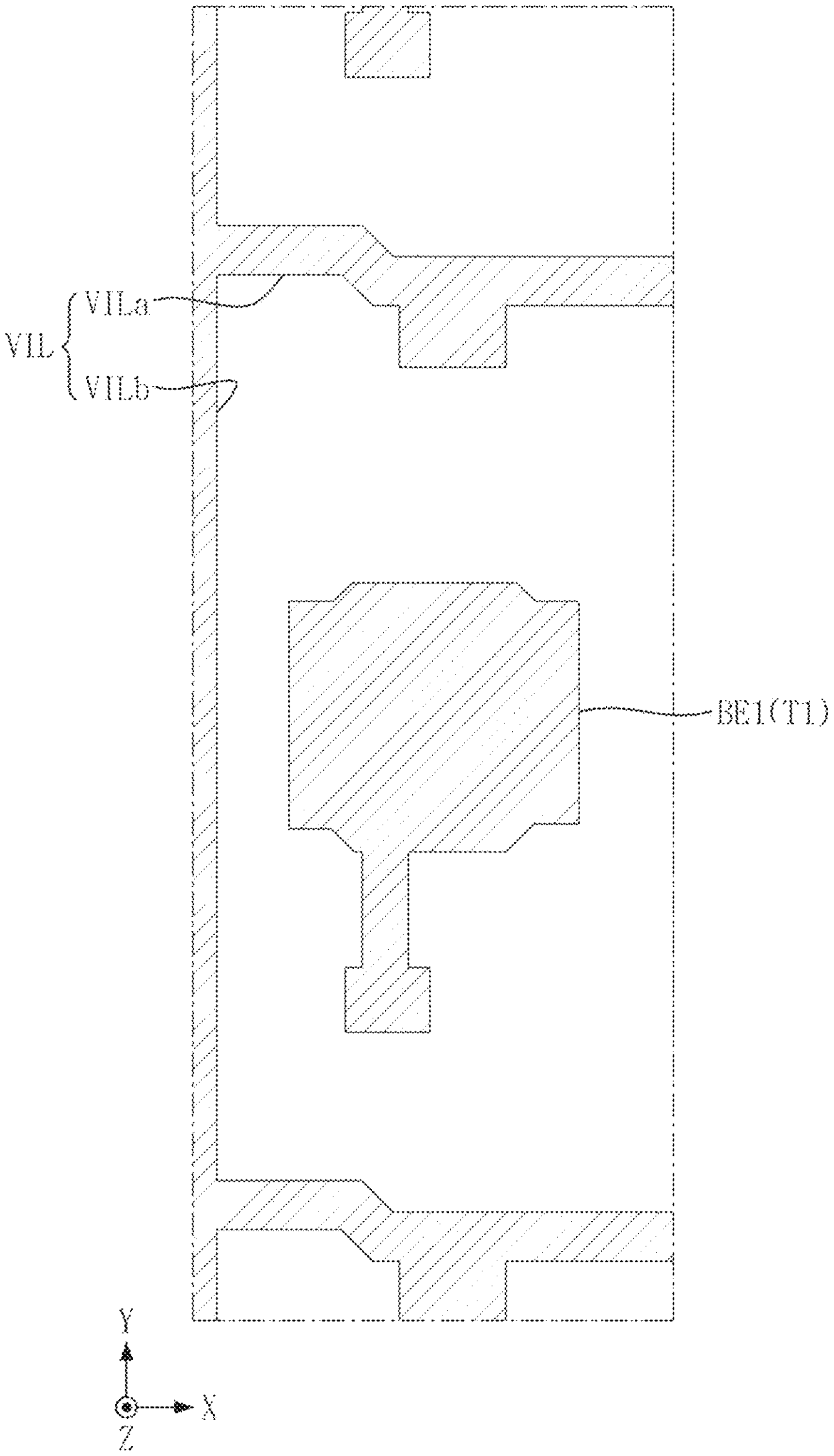
FIG. 9 is a view illustrating a layer of the layout view of FIG. 8.
Figure 10:
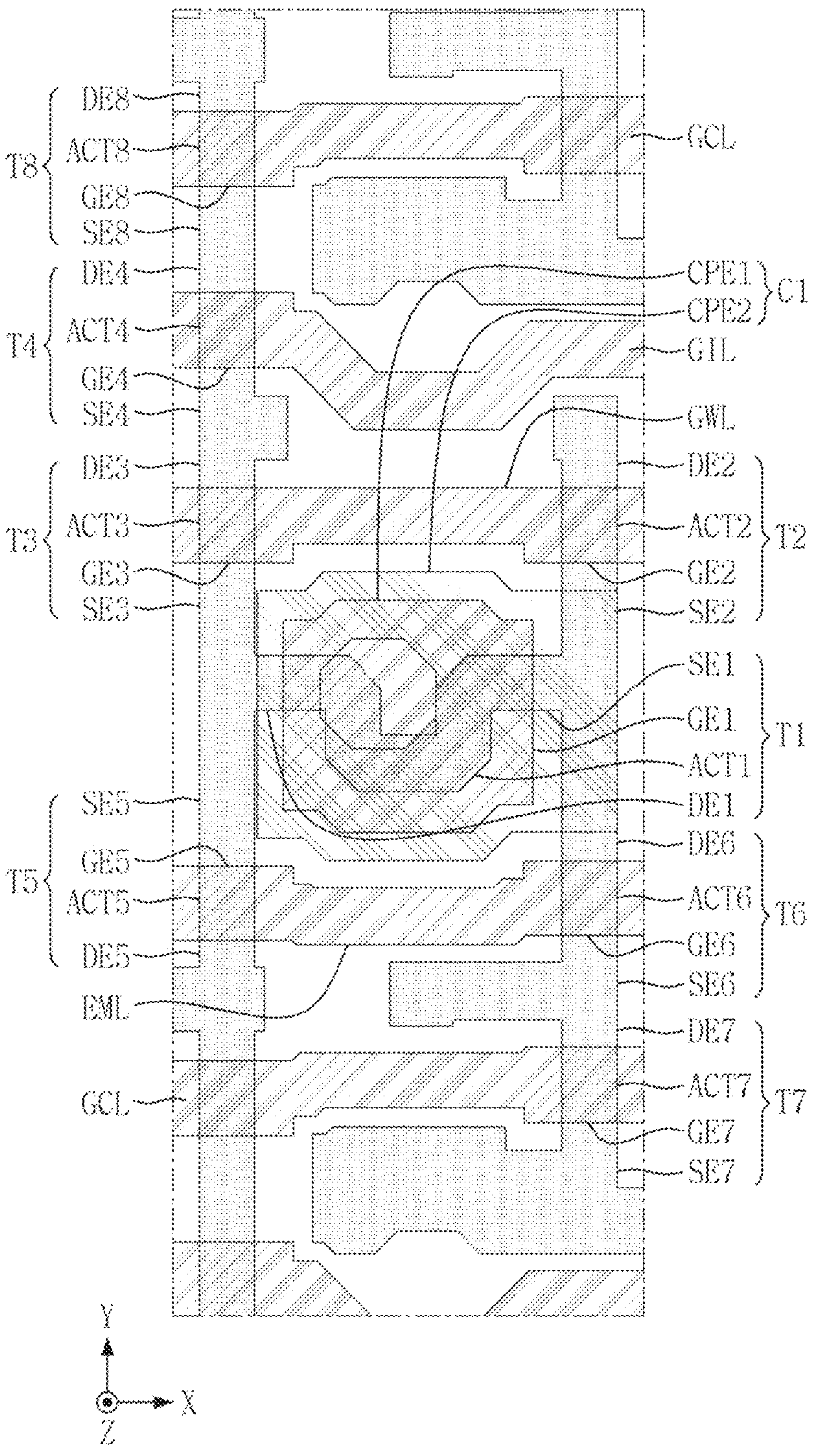
FIG. 10 is a view illustrating some other layers of the layout view of FIG. 8.
Figure 11:
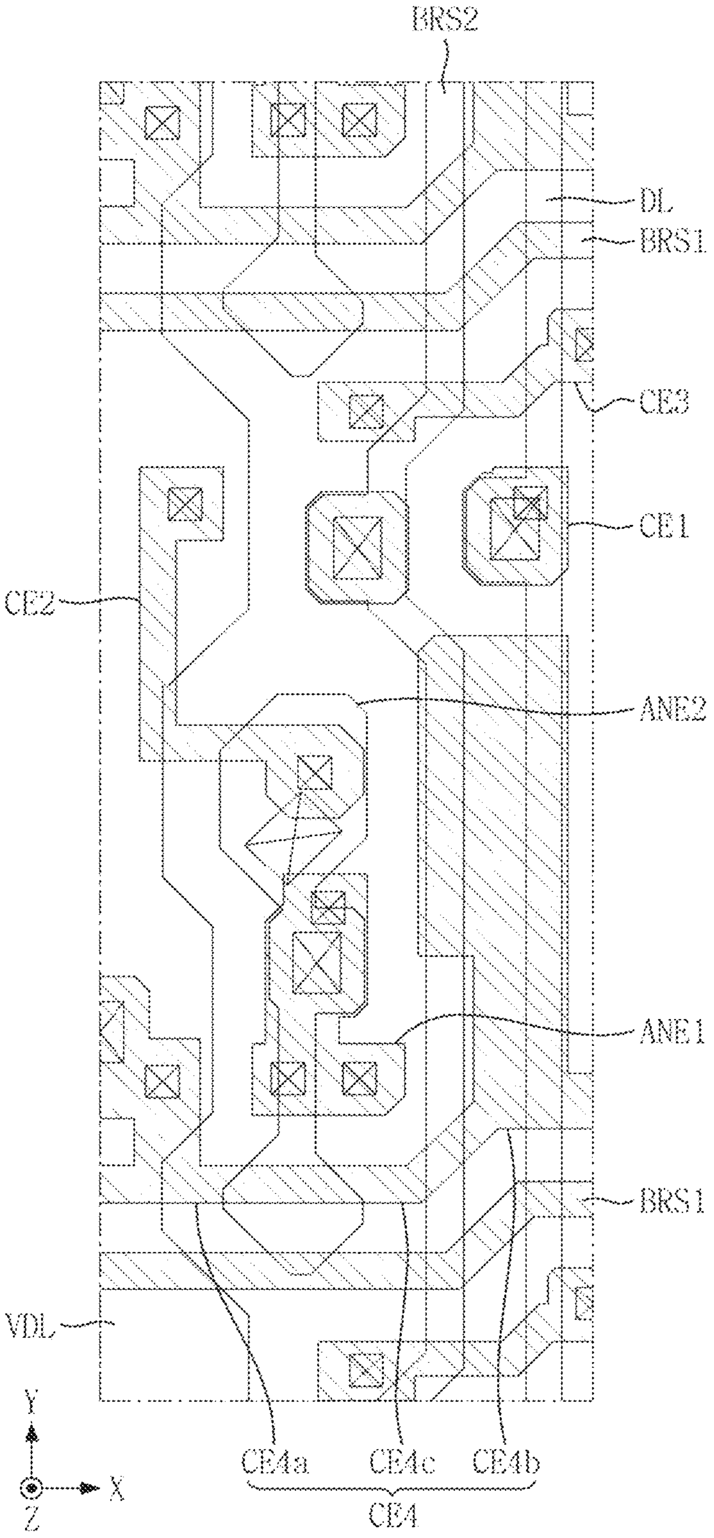
FIG. 11 is a view illustrating some other layers of the layout view of FIG. 8.
Figure 12:
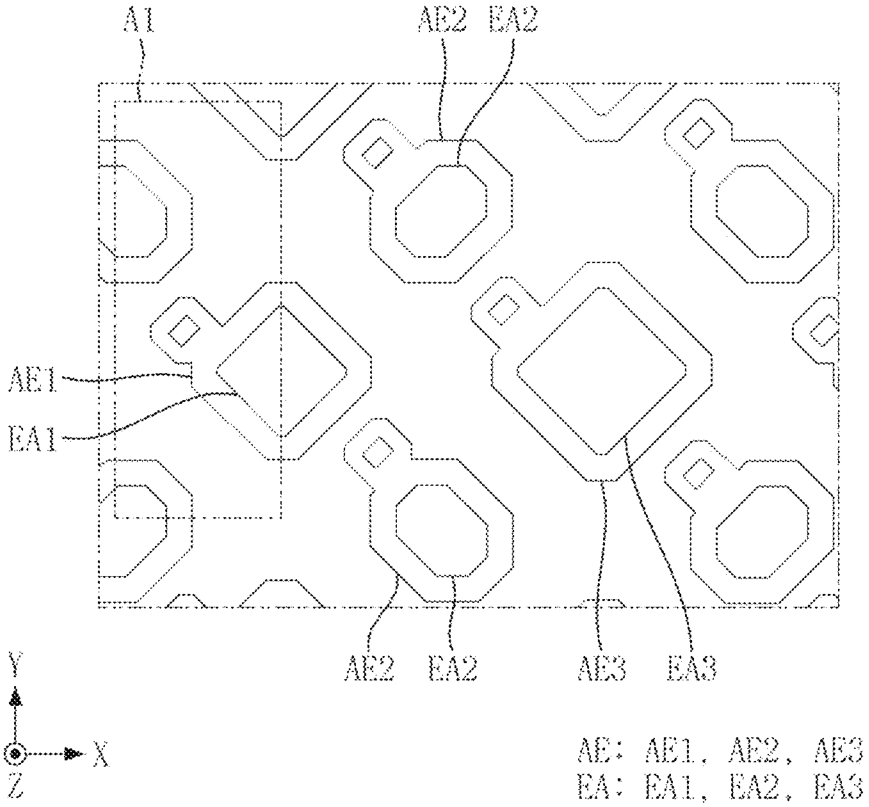
FIG. 12 is a view illustrating pixel electrodes and emission areas of a display device according to an embodiment.
Figure 13:
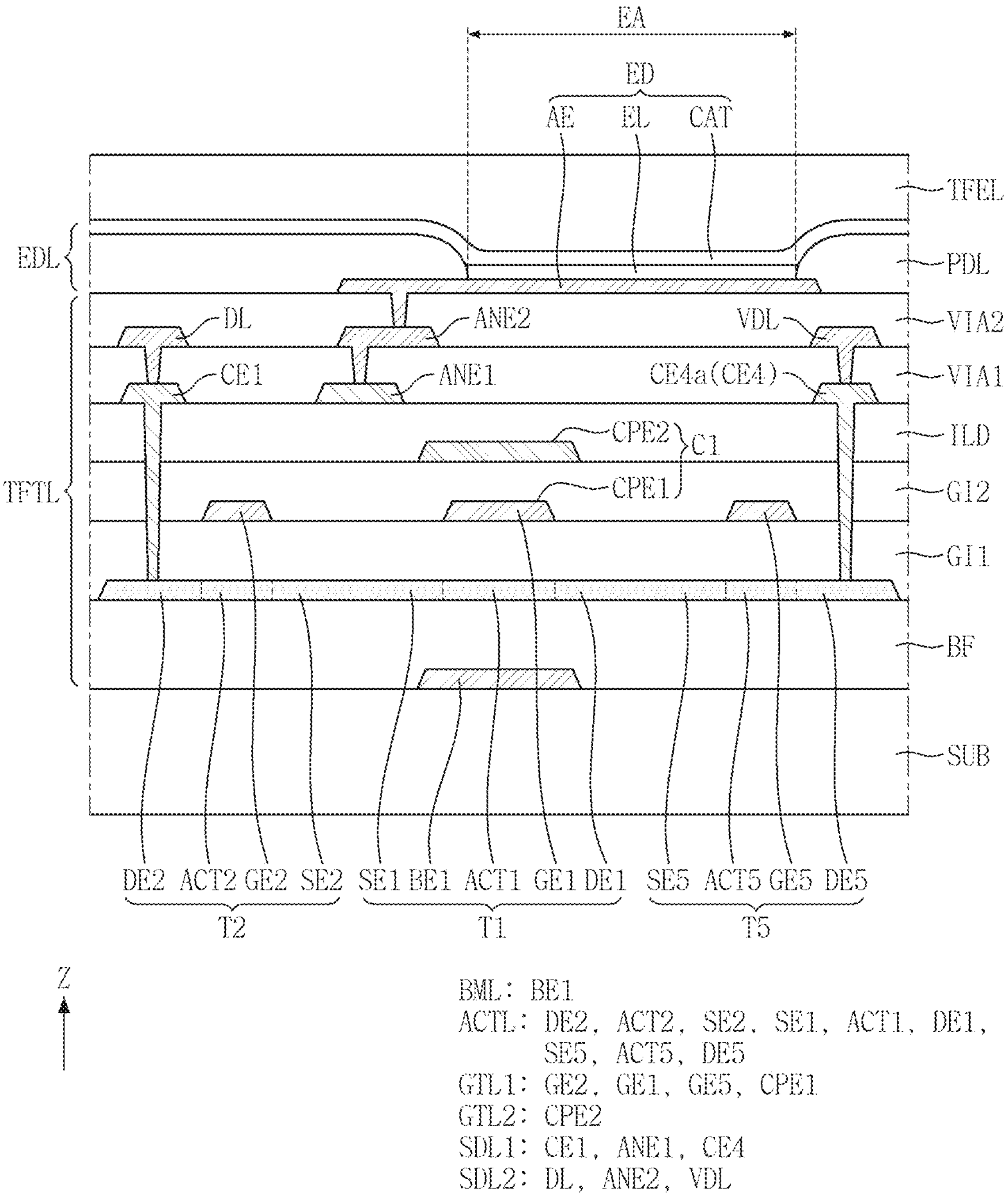
FIG. 13 is a cross-sectional view of a part of the pixel illustrated in FIG. 7.

FIG. 8 is a layout view of the pixel SP illustrated in FIG. 7. FIG. 9 is a view illustrating a layer of the layout view of FIG. 8. For example, FIG. 9 illustrates a metal layer BML. FIG. 10 is a view illustrating some other layers of the layout view of FIG. 8. For example, FIG. 10 illustrates a stacked structure of an active layer ACTL, a first gate layer GTL1, and a second gate layer GTL2. FIG. 11 is a view illustrating some other layers of the layout view of FIG. 8. For example, FIG. 11 illustrates a stacked structure of a first source metal layer SDL1 and a second source metal layer SDL2. FIG. 12 is a view illustrating pixel electrodes and emission areas of a display device according to an embodiment. For example, the area A1 of FIG. 12 may correspond to the area A1 illustrated in FIG. 8. FIG. 13 is a cross-sectional view of a part of the pixel SP illustrated in FIG. 7.

Referring to FIGS. 8 through 13, the pixel SP may be connected to the first gate line GWL, the second gate line GCL, the third gate line GIL, the emission control line EML, the data line DL, the driving voltage line VDL, the initialization voltage line VIL, and the low potential line VSL.

The first transistor T1 may include a semiconductor region ACT1, a gate electrode GE1, a drain electrode DE1, a source electrode SE1, and a bias electrode BE1. The bias electrode BE1 of the first transistor T1 may be disposed in the metal layer BML. The semiconductor region ACT1, the drain electrode DE1, and the source electrode SE1 of the first transistor T1 may be disposed in the active layer ACTL. The gate electrode GE1 of the first transistor T1 may be disposed in the first gate layer GTL1. The gate electrode GE1 of the first transistor T1 may be a part of a first capacitor electrode CPE1 of the first gate layer GTL1, and may overlap with the semiconductor region ACT1 and the bias electrode BE1 of the first transistor T1.

The gate electrode GE1 of the first transistor T1 may be electrically connected to a drain electrode DE3 of the third transistor T3 through a second connection electrode CE2 of the first source metal layer SDL1. The drain electrode DE1 of the first transistor T1 may be formed integrally with a source electrode SE3 of the third transistor T3 and a source electrode SE5 of the fifth transistor T5. The source electrode SE1 of the first transistor T1 may be formed integrally with a source electrode SE2 of the second transistor T2 and a drain electrode DE6 of the sixth transistor T6. The bias electrode BE1 of the first transistor T1 may be electrically connected to a second capacitor electrode CPE2 of the second gate layer GTL2, a source electrode SE6 of the sixth transistor T6, a drain electrode DE7 of the seventh transistor T7, and a first electrode AE of the light emitting element ED through a first anode connection electrode ANE1 of the first source metal layer SDL1 and a second anode connection electrode ANE2 of the second source metal layer SDL2.

The second transistor T2 may include a semiconductor region ACT2, a gate electrode GE2, a drain electrode DE2, and the source electrode SE2. The semiconductor region ACT2, the drain electrode DE2, and the source electrode SE2 of the second transistor T2 may be disposed in the active layer ACTL. The gate electrode GE2 of the second transistor T2 may be disposed in the first gate layer GTL1. The gate electrode GE2 of the second transistor T2 may be a part of the first gate line GWL of the first gate layer GTL1, and may overlap with the semiconductor region ACT2 of the second transistor T2.

The drain electrode DE2 of the second transistor T2 may be electrically connected to the data line DL of the second source metal layer SDL2 through a first connection electrode CE1 of the first source metal layer SDL1. The source electrode SE2 of the second transistor T2 may be formed integrally with the source electrode SE1 of the first transistor T1 and the drain electrode DE6 of the sixth transistor T6.

The third transistor T3 may include a semiconductor region ACT3, a gate electrode GE3, the drain electrode DE3, and the source electrode SE3. The semiconductor region ACT3, the drain electrode DE3, and the source electrode SE3 of the third transistor T3 may be disposed in the active layer ACTL. The gate electrode GE3 of the third transistor T3 may be disposed in the first gate layer GTL1. The gate electrode GE3 of the third transistor T3 may be a part of the first gate line GWL of the first gate layer GTL1, and may overlap with the semiconductor region ACT3 of the third transistor T3.

The drain electrode DE3 of the third transistor T3 may be electrically connected to the gate electrode GE1 of the first transistor T1 through the second connection electrode CE2. The drain electrode DE3 of the third transistor T3 may be formed integrally with a source electrode SE4 of the fourth transistor T4. The source electrode SE3 of the third transistor T3 may be formed integrally with the drain electrode DE1 of the first transistor T1 and the source electrode SE5 of the fifth transistor T5.

The fourth transistor T4 may include a semiconductor region ACT4, a gate electrode GE4, a drain electrode DE4, and the source electrode SE4. The semiconductor region ACT4, the drain electrode DE4, and the source electrode SE4 of the fourth transistor T4 may be disposed in the active layer ACTL. The gate electrode GE4 of the fourth transistor T4 may be disposed in the first gate layer GTL1. The gate electrode GE4 of the fourth transistor T4 may be a part of the third gate line GIL of the first gate layer GTL1, and may overlap with the semiconductor region ACT4 of the fourth transistor T4.

The drain electrode DE4 of the fourth transistor T4 may be formed integrally with a source electrode SE8 of the eighth transistor T8. The source electrode SE4 of the fourth transistor T4 may be formed integrally with the drain electrode DE3 of the third transistor T3.

The fifth transistor T5 may include a semiconductor region ACT5, a gate electrode GE5, a drain electrode DE5, and the source electrode SE5. The semiconductor region ACT5, the drain electrode DE5, and the source electrode SE5 of the fifth transistor T5 may be disposed in the active layer ACTL. The gate electrode GE5 of the fifth transistor T5 may be disposed in the first gate layer GTL1. The gate electrode GE5 of the fifth transistor T5 may be a part of the emission control line EML of the first gate layer GTL1, and may overlap with the semiconductor region ACT5 of the fifth transistor T5.

The drain electrode DE5 of the fifth transistor T5 may be electrically connected to the driving voltage line VDL of the second source metal layer SDL2 through a fourth connection electrode CE4 of the first source metal layer SDL1. The source electrode SE5 of the fifth transistor T5 may be formed integrally with the drain electrode DE1 of the first transistor T1 and the source electrode SE3 of the third transistor T3.

The fourth connection electrode CE4 may include a first portion CE4*a*, a second portion CE4*b*, and a third portion CE4*c*. The first portion CE4*a* of the fourth connection electrode CE4 may overlap with the drain electrode DE5 of the fifth transistor T5, and may electrically connect the fifth transistor T5 and the driving voltage line VDL to each other. The second portion CE4*b* of the fourth connection electrode CE4 may overlap with a second bridge line BRS2 and the data line DL of the second source metal layer SDL2, and may stably maintain the voltage of the first electrode AE of the light emitting element ED by shielding the second source metal layer SDL2 and the second gate layer GTL2. The third portion CE4*c* of the fourth connection electrode CE4 may connect the first portion CE4*a* and the second portion CE4*b* to each other.

A first bridge line BRS1 may be disposed in the first source metal layer SDL1 to extend in the X-axis direction, and the second bridge line BRS2 may be disposed in the second source metal layer SDL2 to extend in the Y-axis direction. The first and second bridge lines BRS1 and BRS2 may electrically connect the data line DL, which may not be directly connected to the display driver 200, to the display driver 200.

The sixth transistor T6 may include a semiconductor region ACT6, a gate electrode GE6, the drain electrode DE6, and the source electrode SE6. The semiconductor region ACT6, the drain electrode DE6, and the source electrode SE6 of the sixth transistor T6 may be disposed in the active layer ACTL. The gate electrode GE6 of the sixth transistor T6 may be disposed in the first gate layer GTL1. The gate electrode GE6 of the sixth transistor T6 may be a part of the emission control line EML, and may overlap with the semiconductor region ACT6 of the sixth transistor T6.

The drain electrode DE6 of the sixth transistor T6 may be formed integrally with the source electrode SE1 of the first transistor T1 and the source electrode SE2 of the second transistor T2. The source electrode SE6 of the sixth transistor T6 may be formed integrally with the drain electrode DE7 of the seventh transistor T7. The source electrode SE6 of the sixth transistor T6 may be electrically connected to the bias electrode BE1 of the first transistor T1, the second capacitor electrode CPE2, and the first electrode AE of the light emitting element ED through the first and second anode connection electrodes ANE1 and ANE2.

The seventh transistor T7 may include a semiconductor region ACT7, a gate electrode GE7, the drain electrode DE7, and a source electrode SE7. The semiconductor region ACT7, the drain electrode DE7, and the source electrode SE7 of the seventh transistor T7 may be disposed in the active layer ACTL. The gate electrode GE7 of the seventh transistor T7 may be disposed in the first gate layer GTL1. The gate electrode GE7 of the seventh transistor T7 may be a part of the second gate line GCL of the first gate layer GTL1, and may overlap with the semiconductor region ACT7 of the seventh transistor T7.

The drain electrode DE7 of the seventh transistor T7 may be formed integrally with the source electrode SE6 of the sixth transistor T6. The drain electrode DE7 of the seventh transistor T7 may be electrically connected to the bias electrode BE1 of the first transistor T1, the second capacitor electrode CPE2, and the first electrode AE of the light emitting element ED through the first and second anode connection electrodes ANE1 and ANE2. The source electrode SE7 of the seventh transistor T7 may be electrically connected to the initialization voltage line VIL of the metal layer BML through a third connection electrode CE3 of the first source metal layer SDL1.

The initialization voltage line VIL may include a first portion VILa and a second portion VILb. The first portion VILa of the initialization voltage line VIL may extend in the X-axis direction, and may be connected to the third connection electrode CE3. The second portion VILb of the initialization voltage line VIL may extend in the Y-axis direction. The first portion VILa and the second portion VILb may be connected to each other in a mesh form throughout the display area DA.

The eighth transistor T8 may include a semiconductor region ACT8, a gate electrode GE8, a drain electrode DE8, and the source electrode SE8. The semiconductor region ACT8, the drain electrode DE8, and the source electrode SE8 of the eighth transistor T8 may be disposed in the active layer ACTL. The gate electrode GE8 of the eighth transistor T8 may be disposed in the first gate layer GTL1. The gate electrode GE8 of the eighth transistor T8 may be a part of the second gate line GCL of the first gate layer GTL1, and may overlap with the semiconductor region ACT8 of the eighth transistor T8.

The drain electrode DE8 of the eighth transistor T8 may be electrically connected to the driving voltage line VDL through the fourth connection electrode CE4. The source electrode SE8 of the eighth transistor T8 may be formed integrally with the drain electrode DE4 of the fourth transistor T4.

The first capacitor C1 may include the first capacitor electrode CPE1 and the second capacitor electrode CPE2. The first and second capacitor electrodes CPE1 and CPE2 may overlap with each other. The first capacitor electrode CPE1 of the first capacitor C1 may be disposed in the first gate layer GTL1, and the second capacitor electrode CPE2 may be disposed in the second gate layer GTL2. The first capacitor electrode CPE1 may include the gate electrode GE1 of the first transistor T1. The second capacitor electrode CPE2 may be electrically connected to the bias electrode BE1 of the first transistor T1, the source electrode SE6 of the sixth transistor T6, the drain electrode DE7 of the seventh transistor T7, and the first electrode AE of the light emitting element ED through the first and second anode connection electrodes ANE1 and ANE2.

As shown in FIG. 12, the display area DA may include a plurality of emission areas EA and a plurality of first electrodes AE of the light emitting elements ED. The emission areas EA may emit light of the light emitting elements ED. The emission areas EA may include a first emission area EA1 of a first pixel, a second emission area EA2 of a second pixel, and a third emission area EA3 of a third pixel. The first electrodes AE of the light emitting elements ED may include a first electrode AE1 of the first pixel, a first electrode AE2 of the second pixel, and a first electrode AE3 of the third pixel. The first emission area EA1 may overlap with the first electrode AE1 of the first pixel, the second emission area EA2 may overlap with the first electrode AE2 of the second pixel, and the third emission area EA3 may overlap with the first electrode AE3 of the third pixel. For example, the first emission area EA1 may emit light of a first color (e.g., red light), the second emission area EA2 may emit light of a second color (e.g., green light), and the third emission area EA3 may emit light of a third color (e.g., blue light), but the present disclosure is not limited thereto.

One unit pixel may express a white gray level (e.g., a white grayscale level or value) by including one first emission area EA1, two second emission areas EA2, and one third emission area EA3. However, the configuration of the unit pixel is not limited thereto. The white gray level may be expressed by a combination of light emitted from one first emission area EA1, light emitted from two second emission areas EA2, and light emitted from one third emission area EA3.

The areas of the first through third emission areas EA1 through EA3 may be different from each other. For example, the area of the third emission area EA3 may be larger than the area of the first emission area EA1, and the area of the first emission area EA1 may be larger than the area of the second emission area EA2. However, the present disclosure is not limited thereto. As another example, the first through third emission areas EA1 through EA3 may have the same or substantially the same sized area as each other.

As shown in FIG. 13, the display panel 100 may include a substrate SUB, a transistor layer TFTL, a light emitting element layer EDL, and an encapsulation layer TFEL.

The substrate SUB may be a base substrate or a base member. The substrate SUB may be a flexible substrate that may be bent, folded, rolled, and/or the like. For example, the substrate SUB may include a polymer resin such as polyimide (PI), but the present disclosure is not limited thereto. As another example, the substrate SUB may include a glass material or a metal material.

The transistor layer TFTL may include the metal layer BML, a buffer layer BF, the active layer ACTL, a first gate insulating layer GI1, the first gate layer GTL1, a second gate insulating layer GI2, the second gate layer GTL2, an interlayer insulating layer ILD, the first source metal layer SDL1, a first via layer VIA1, the second source metal layer SDL2, and a second via layer VIA2.

The metal layer BML may be disposed on the substrate SUB. The metal layer BML may include the first bias electrode BE1 of the first transistor T1.

The buffer layer BF may be disposed on the metal layer BML. For example, the buffer layer BF may include an inorganic layer that may prevent or substantially prevent penetration of air and/or moisture. For example, the buffer layer BF may include a plurality of inorganic layers that are stacked alternately.

The active layer ACTL may be disposed on the buffer layer BF. The active layer ACTL may include an oxide-based material. For example, the active layer ACTL may include the semiconductor regions ACT1, ACT2, and ACT5, the drain electrodes DE1, DE2, and DE5, and the source electrodes SE1, SE2, and SE5 of the first transistor T1, the second transistor T2, and the fifth transistor T5.

The first gate insulating layer GI1 may be disposed on the active layer ACTL. The first gate insulating layer GI1 may insulate the active layer ACTL from the first gate layer GTL1.

The first gate layer GTL1 may be disposed on the first gate insulating layer GI1. The first gate layer GTL1 may include the gate electrodes GE1, GE2, and GE5 of the first transistor T1, the second transistor T2, and the fifth transistor T5, and the first capacitor electrode CPE1.

The second gate insulating layer GI2 may be disposed on the first gate layer GTL1. The second gate insulating layer GI2 may insulate the first gate layer GTL1 from the second gate layer GTL2.

The second gate layer GTL2 may be disposed on the second gate insulating layer GI2. The second gate layer GTL2 may include the second capacitor electrode CPE2.

The interlayer insulating layer ILD may be disposed on the second gate layer GTL2. The interlayer insulating layer ILD may insulate the second gate layer GTL2 from the first source metal layer SDL1.

The first source metal layer SDL1 may be disposed on the interlayer insulating layer ILD. The first source metal layer SDL1 may include the first and fourth connection electrodes CE1 and CE4, and the first anode connection electrode ANE1.

The first via layer VIA1 may be disposed on the first source metal layer SDL1. The first via layer VIA1 may insulate the first source metal layer SDL1 from the second source metal layer SDL2.

The second source metal layer SDL2 may be disposed on the first via layer VIA1. The second source metal layer SDL2 may include the data line DL, the second anode connection electrode ANE2, and the driving voltage line VDL.

The second via layer VIA2 may be disposed on the second source metal layer SDL2. The second via layer VIA2 may insulate the second source metal layer SDL2 from the first electrode AE of the light emitting element ED.

The light emitting element layer EDL may include a pixel defining layer PDL and the light emitting element ED. The light emitting element ED may include the first electrode AE, a light emitting layer EL, and a second electrode CAT.

The pixel defining layer PDL may be disposed on the second via layer VIA2. The pixel defining layer PDL may define a plurality of emission areas EA. The pixel defining layer PDL may include an organic insulating material, such as polyimide (PI).

The first electrode AE may be disposed on the second via layer VIA2. The first electrode AE may overlap with one of the emission areas EA defined by the pixel defining layer PDL. The first electrode AE may receive a driving current from the pixel circuit of the pixel SP.

The light emitting layer EL may be disposed on the first electrode AE. For example, the light emitting layer EL may be an organic light emitting layer including (e.g., made of) an organic material. However, the present disclosure is not limited thereto. When the light emitting layer EL corresponds to an organic light emitting layer, if the pixel circuit of the pixel SP applies a voltage (e.g., a predetermined voltage) to the first electrode AE and the second electrode CAT receives a common voltage or a cathode voltage, holes may move to the organic light emitting layer EL through a hole transporting layer, and electrons may move to the organic light emitting layer EL through an electron transporting layer. The holes and the electrons may be combined with each other in the organic light emitting layer EL to emit light.

The second electrode CAT may be disposed on the light emitting layer EL. For example, the second electrode CAT may be implemented in the form of an electrode that is common to all of the pixels SP, rather than being separated for each pixel SP. The second electrode CAT may be disposed on the light emitting layer EL in a plurality of emission areas EA, and may be disposed on the pixel defining layer PDL in an area other than the emission areas EA.

The encapsulation layer TFEL may be disposed on the second electrode CAT to cover the plurality of light emitting elements ED. The encapsulation layer TFEL may include at least one inorganic layer to prevent or substantially prevent oxygen and/or moisture from penetrating into the light emitting elements ED. The encapsulation layer TFEL may include at least one organic layer to protect the light emitting elements ED from foreign substances, such as dust.

Figure 14:
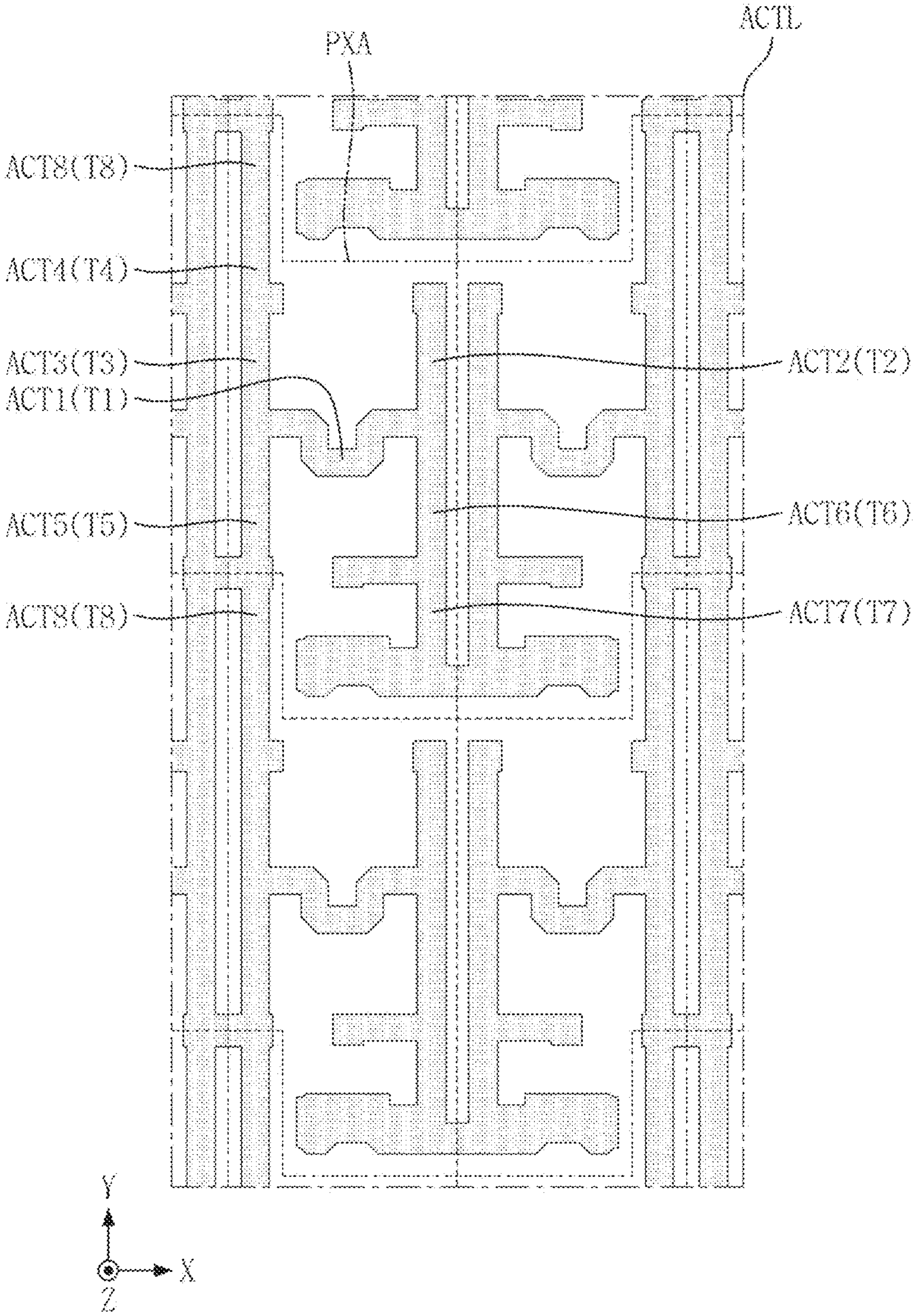
FIG. 14 is a layout view of active layers of a plurality of pixels according to an embodiment.

FIG. 14 is a layout view of active layers of a plurality of pixels according to an embodiment.

Referring to FIG. 14, the active layers ACTL of adjacent pixels SP may be connected to each other. The active layers ACTL of the pixels SP may be connected to one another horizontally and vertically in a mesh form. For example, one pixel SP may include the semiconductor regions ACT1 through ACT8 of the first through eighth transistors T1 through T8 that are disposed in one pixel area PXA.

For example, the pixels SP that are adjacent to each other in the X-axis direction may be symmetrical or substantially symmetrical to each other with respect to an axis of symmetry extending in the Y-axis direction. In the pixels SP that are adjacent to each other in the X-axis direction, the semiconductor region ACT7 of the seventh transistor T7 of a left pixel SP may be connected to the semiconductor region ACT7 of the seventh transistor T7 of a right pixel SP through the active layer ACTL. In the pixels SP that are adjacent to each other in the X-axis direction, the semiconductor region ACT5 of the fifth transistor T5 of the left pixel SP may be connected to the semiconductor region ACT5 of the fifth transistor T5 of the right pixel SP through the active layer ACTL. In the pixels SP that are adjacent to each other in the X-axis direction, the semiconductor region ACT8 of the eighth transistor T8 of the left pixel SP may be connected to the semiconductor region ACT8 of the eighth transistor T8 of the right pixel SP through the active layer ACTL.

For example, in the pixels SP that are adjacent to each other in the Y-axis direction, the semiconductor region ACT8 of the eighth transistor T8 of a lower pixel SP may be connected to the semiconductor region ACT5 of the fifth transistor T5 of an upper pixel SP through the active layer ACTL.

Therefore, the active layers ACTL of the pixels SP may be connected to one another horizontally and vertically in a mesh form. Because the display device 10 includes oxide-based semiconductor regions, and the active layers ACTL connected to adjacent pixels SP, the display device 10 may have a static electricity resistant structure that may prevent or substantially prevent the generation of static electricity.

A display device according to some embodiments of the present disclosure may initialize a gate electrode of a first transistor to a driving voltage, thereby preventing or substantially preventing crosstalk, while omitting a separate voltage line, and may have a static electricity resistant structure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a light emitting element on a substrate;

a first transistor configured to control a driving current to flow through the light emitting element;

a second transistor configured to supply a data voltage to a source electrode of the first transistor;

a third transistor electrically connecting a gate electrode of the first transistor and a drain electrode of the first transistor to each other;

a fourth transistor configured to supply a driving voltage to the gate electrode of the first transistor; and a fifth transistor configured to supply the driving voltage to the drain electrode of the first transistor, wherein the driving voltage supplied by the fourth transistor and the driving voltage supplied by the fifth transistor are from a same driving voltage line, and wherein, in a plan view, the fourth transistor and the fifth transistor overlap with the same driving voltage line.

2. The display device of claim 1, wherein the first transistor comprises a bias electrode electrically connected to a first electrode of the light emitting element.

3. The display device of claim 1, further comprising:

a sixth transistor electrically connecting the source electrode of the first transistor and a first electrode of the light emitting element to each other;

a seventh transistor configured to discharge the first electrode of the light emitting element to an initialization voltage; and a first capacitor between the gate electrode of the first transistor and the first electrode of the light emitting element.

4. The display device of claim 3, wherein the second and third transistors are configured to be turned on based on a first gate signal, the seventh transistor is configured to be turned on based on a second gate signal, the fourth transistor is configured to be turned on based on a third gate signal, and the fifth and sixth transistors are configured to be turned on based on an emission signal.

5. The display device of claim 4, wherein the third gate signal has a high level during a first period, the first gate signal has a high level during a second period after the first period, the second gate signal has a high level during a third period comprising the first period and the second period, and the emission signal has a high level during a fourth period after the third period.

6. A display device comprising:

a light emitting element on a substrate;

a first transistor configured to control a driving current to flow through the light emitting element;

a second transistor configured to supply a data voltage to a source electrode of the first transistor;

a third transistor electrically connecting a gate electrode of the first transistor and a drain electrode of the first transistor to each other;

a fourth transistor connected to the gate electrode of the first transistor to supply a driving voltage to the gate electrode of the first transistor;

a fifth transistor configured to supply the driving voltage to the drain electrode of the first transistor;

a sixth transistor electrically connecting the source electrode of the first transistor and a first electrode of the light emitting element to each other;

a seventh transistor configured to discharge the first electrode of the light emitting element to an initialization voltage; and an eighth transistor configured to supply the driving voltage to the fourth transistor, wherein the driving voltage supplied by the fifth transistor and the driving voltage supplied by the eight transistor are from a same driving voltage line, and wherein the seventh transistor and the eighth transistor are configured to be concurrently turned on or concurrently turned off with each other according to a same gate signal.

7. The display device of claim 6, wherein the first transistor comprises a bias electrode electrically connected to the first electrode of the light emitting element.

8. The display device of claim 6, further comprising a first capacitor between the gate electrode of the first transistor and the first electrode of the light emitting element.

9. The display device of claim 6, wherein the second and third transistors are configured to be turned on based on a first gate signal, the seventh and eighth transistors are configured to be turned on based on a second gate signal, the fourth transistor is configured to be turned on based on a third gate signal, and the fifth and sixth transistors are configured to be turned on based on an emission signal.

10. The display device of claim 9, wherein the third gate signal has a high level during a first period, the first gate signal has a high level during a second period after the first period, the second gate signal has a high level during a third period comprising the first period and the second period, and the emission signal has a high level during a fourth period after the third period.

11. A display device comprising:

a light emitting element on a substrate;

a first transistor configured to control a driving current to flow through the light emitting element;

a second transistor configured to supply a data voltage to a source electrode of the first transistor;

a third transistor electrically connecting a gate electrode of the first transistor and a drain electrode of the first transistor to each other;

a fourth transistor connected to the gate electrode of the first transistor;

a fifth transistor configured to supply a driving voltage to the drain electrode of the first transistor;

a sixth transistor electrically connecting the source electrode of the first transistor and a first electrode of the light emitting element to each other;

a seventh transistor configured to discharge the first electrode of the light emitting element to an initialization voltage;

an eighth transistor configured to supply the driving voltage to the fourth transistor;

a metal layer on the substrate, and comprising a bias electrode of the first transistor;

an active layer on the metal layer, and comprising a semiconductor region of the first transistor;

a first gate layer on the active layer, and comprising the gate electrode of the first transistor;

a second gate layer on the first gate layer;

a first source metal layer on the second gate layer; and a second source metal layer on the first source metal layer, and comprising a data line extending in a first direction.

12. The display device of claim 11, wherein the first source metal layer comprises a first connection electrode electrically connecting the data line and a drain electrode of the second transistor to each other.

13. The display device of claim 11, wherein the first source metal layer comprises a second connection electrode electrically connecting the gate electrode of the first transistor and a drain electrode of the third transistor to each other.

14. The display device of claim 11, wherein the metal layer comprises an initialization voltage line configured to supply the initialization voltage, and the initialization voltage line comprises:

a first portion extending in a second direction crossing the first direction, and electrically connected to the seventh transistor; and a second portion extending in the first direction, and connected to the first portion.

15. The display device of claim 14, wherein the first source metal layer comprises a third connection electrode electrically connecting the first portion of the initialization voltage line and a source electrode of the seventh transistor to each other.

16. The display device of claim 11, wherein the first gate layer comprises a first capacitor electrode comprising the gate electrode of the first transistor, and the second gate layer comprises a second capacitor electrode overlapping with the first capacitor electrode.

17. The display device of claim 16, wherein the first source metal layer comprises a first anode connection electrode connected to the second capacitor electrode, and the second source metal layer comprises a second anode connection electrode electrically connecting the first anode connection electrode and the first electrode of the light emitting element to each other.

18. The display device of claim 11, wherein the second source metal layer comprises a driving voltage line configured to supply the driving voltage, and the first source metal layer comprises a fourth connection electrode electrically connecting a drain electrode of the fifth transistor and the driving voltage line to each other.

19. The display device of claim 11, further comprising a plurality of pixels, at least one of the pixels comprising the first through eighth transistors and the light emitting element, wherein, in first and second pixels that are adjacent to each other in the first direction from among the pixels, the drain electrode of the fifth transistor of the first pixel is integral with a drain electrode of the eighth transistor of the second pixel.

20. The display device of claim 19, wherein, in third and fourth pixels that are adjacent to each other in a second direction crossing the first direction from among the pixels, the source electrode of the seventh transistor of the third pixel is integral with the source electrode of the seventh transistor of the fourth pixel.

* * * * *